US008738751B2

(12) United States Patent
Long et al.

(10) Patent No.: US 8,738,751 B2
(45) Date of Patent: May 27, 2014

(54) METHOD AND SYSTEM FOR GENERATING INSTRUCTION SIGNALS FOR PERFORMING INTERVENTIONS IN A COMMUNICATION NETWORK, AND CORRESPONDING COMPUTER-PROGRAM PRODUCT

(75) Inventors: Daniela Long, Turin (IT); Danilo Gotta, Turin (IT); Fabrizio Bobbio, Turin (IT); Massimo Chiappone, Turin (IT); Giulio Valente, Nichelino (IT)

(73) Assignee: Telecom Italia S.p.A., Milan (IT)

( * ) Notice: Subject to any disclaimer, the term of this patent is extended or adjusted under 35 U.S.C. 154(b) by 926 days.

(21) Appl. No.: 11/989,640

(22) PCT Filed: Jul. 29, 2005

(86) PCT No.: PCT/EP2005/008238
§ 371 (c)(1),
(2), (4) Date: Jan. 29, 2008

(87) PCT Pub. No.: WO2007/016934
PCT Pub. Date: Feb. 15, 2007

(65) Prior Publication Data
US 2009/0049165 A1 Feb. 19, 2009

(51) Int. Cl.
*G06F 15/173* (2006.01)
(52) U.S. Cl.
USPC .......................................................... 709/223
(58) Field of Classification Search
USPC ................................................. 709/223–226
See application file for complete search history.

(56) References Cited

U.S. PATENT DOCUMENTS

| | | | | |
|---|---|---|---|---|
| 5,651,006 A * | 7/1997 | Fujino et al. | ................... | 370/408 |
| 5,826,239 A | 10/1998 | Du et al. | | |
| 5,872,931 A * | 2/1999 | Chivaluri | ....................... | 709/223 |
| 5,944,782 A * | 8/1999 | Noble et al. | .................. | 709/202 |
| 5,991,806 A * | 11/1999 | McHann, Jr. | ................. | 709/224 |
| 6,078,955 A * | 6/2000 | Konno et al. | ................. | 709/224 |
| 7,234,082 B2 * | 6/2007 | Lai et al. | ........................... | 714/42 |
| 7,463,595 B1 * | 12/2008 | Singhal et al. | ................ | 370/254 |
| 2002/0161875 A1 * | 10/2002 | Raymond | ..................... | 709/223 |

(Continued)

FOREIGN PATENT DOCUMENTS

WO     WO 01/29663 A1    4/2001
WO     WO 2005/018249 A1    2/2005

OTHER PUBLICATIONS

Valente et al.; "Remoter: An Operational Knowledge Management System for Telecommunication Operators", Workshop on Knowledge Management and Organizational Memories, 16$^{th}$ European Conference on Artificial Intelligence (ECAI), 3 sheets, (2004).

(Continued)

*Primary Examiner* — Brian P Whipple
(74) *Attorney, Agent, or Firm* — Finnegan, Henderson, Farabow, Garrett & Dunner, L.L.P.

(57) ABSTRACT

A system for generating instruction signals arranged in workflow for performing interventions on network equipment included in a communication network, wherein the equipment is associated with resource proxy agents, each responsible for managing a single equipment in the network. The system includes a distributed architecture of intervention management proxy agents to generate the instruction signals. The intervention management proxy agents are interactively coupled with the resource proxy agents, whereby the instruction signals are a function of the status of the equipment in the network on which the interventions are performed.

47 Claims, 7 Drawing Sheets

(56) References Cited

U.S. PATENT DOCUMENTS

| | | | |
|---|---|---|---|
| 2003/0093520 A1* | 5/2003 | Beesley | 709/224 |
| 2004/0044542 A1 | 3/2004 | Beniaminy et al. | |
| 2004/0196794 A1 | 10/2004 | Fu | |
| 2006/0230127 A1* | 10/2006 | Farouki et al. | 709/223 |
| 2009/0254971 A1* | 10/2009 | Herz et al. | 726/1 |

OTHER PUBLICATIONS

"Enhanced Telecom Operations Map® (eTOM), The Business Process Framework: For the Information and Communications Services Industry", GB921, TMF Approved Version 4.0, TeleManagement Forum, pp. iii-xix, and pp. 1-69, (2004).

"Enhanced Telecom Operations Map® (eTOM), The Business Process Framework: For the Information and Communications Services Industry", Addendum D: Process Decompositions and Descriptions, GB921 D, TMF Approved Version 4.0, TeleManagement Forum, pp. iii-xxiii, and pp. 1-146, (2004).

"Enhanced Telecom Operations Map® (eTOM), The Business Process Framework: For the Information and Communications Services Industry", Release 5.0, GB921, Member Evaluation Version 0.3, TeleManagement Forum, pp. 1-81, (2005).

"Enhanced Telecom Operations Map® (eTOM), The Business Process Framework: For the Information and Communications Services Industry", Addendum D: Process Decompositions and Descriptions, Release 5.0, GB921 D, Member Evaluation Version 0.6, TeleManagement Forum, pp. 1-261, (2005).

Corley; "Communications Management Process Integration Using Software Agents: A Specification of a Framework for Agent Oriented Workflow Management Systems", Project P815, XP-002343307, EURESCOM Participants in Project P815, Deliverable 1, vol. 2, Framework Specification, pp. 1 (92)-92 (92), (2001).

Rigallo et al.; "Real-Time Monitoring and Operational Assistant System for Mobile Networks", IEEE, XP-001176101, pp. 899-901, (2002).

* cited by examiner

METHOD AND SYSTEM FOR GENERATING INSTRUCTION SIGNALS FOR PERFORMING INTERVENTIONS IN A COMMUNICATION NETWORK, AND CORRESPONDING COMPUTER-PROGRAM PRODUCT

CROSS REFERENCE TO RELATED APPLICATION

This application is a national phase application based on PCT/EP2005/008238, filed Jul. 29, 2005.

FIELD OF THE INVENTION

The present invention relates to techniques that enable generation of instruction signals organized as workflows for performing interventions in a communication network.

The invention has been developed with particular attention paid to its possible use in the context of distributed platforms for management and support to the operation of the workforce and of the customers.

DESCRIPTION OF THE RELATED ART

The costs of the operational processes, such as the ones for providing new services to customers or for removing failures and malfunction, represent an important percentage of the costs that telecommunications operators must face yearly. Hence the importance of methods/systems aimed at reducing said costs through tools supporting activities of both operator workforce and customers, which can thereby be directly involved in removing troubles related to equipments in the customer premises.

Support to the workforce and to the customer, who is directly involved in actions of repairing failures/malfunctions, can be provided by using two main tools: Knowledge Management Systems (KMs), or rather Operational Knowledge Management Systems (OKMs), and advanced management platforms, viewed not as separate entities, but as components of an integrated and complete solution.

By "Knowledge Management (KM)" is meant the activity that enables creation, dissemination and usage of the knowledge of an organization. Amongst the various approaches to KM, companies generally prefer the local one, which focuses on the management of a part of the knowledge and on specific targets (for example, decision-making, problem-solving, etc.). Operational Knowledge Management (OKM) is a local approach to the management of knowledge, focused on the management of the operational knowledge. This type of knowledge includes methods and techniques (operational practices) necessary to carry out a particular job or a specific activity. Typical users of an OKMS are field engineers of a company and Call Centre advisors.

KM/OKM systems representing the current level of development of these techniques are described, for example in the document US-A-2004/0044542 and in the article by G. Valente and A. Rigallo: "Remoter: an Operational Knowledge Management System for Telecommunication Operators", Workshop on Knowledge Management and Organizational Memories, 16th European Conference on Artificial Intelligence (ECAI), 2004.

The solutions described in the above documents are proposed as tools to support problem-solving activities such as the ones that can be carried out by the workforce of a telecommunications operator (to deal with customer complaints or to fulfil customer requests of new services) or even by the customer himself, directly involved in activities of self-caring on equipments at his premises.

In particular, the document US-A-2004/0044542 describes a method and a system for capturing and sharing the knowledge among the technical staff of a given company, between said staff and the users and between the users and the technical staff of other companies. Said method and system can be applied to various domains, amongst which also the domain of telecommunications services, and provide a support to problem-solving activities, using Case-Based Reasoning and Model-Based Reasoning approaches.

In the article by Valente and Rigallo, instead, a system of Operational Knowledge Management (OKM,) referred to as Remoter, is defined, said system being used in a context of telecommunications for supporting the technicians of a telecommunications operator during their daily activities. In particular, Remoter has been used and tested in the context of the Provisioning and Assurance processes of ADSL services, in which the technicians must react in a short time and choose the best solution. The purpose of the system is to enable the technicians to share, capture and apply their Operational Knowledge for taking optimal decisions in real-time. Said system uses the Conversational Case-Based Reasoning approach to support problem-solving.

The document WO-A-2005/018249 describes a system architecture based upon an agent paradigm and with a high degree of flexibility and scalability, for distributed management of a telecommunications network and of the supported services. The key points of said architecture are:

a platform for network and service management based upon distributed agents, associated to workflow engines and rule engines, and organized into three hierarchical levels;

Process Engines (workflow engines and rule engines) used not only for co-ordination of the components (of the applications), but also for flexible implementation of all of the functional and behavioural aspects of the platform;

a centralized model inventory (Model Data Base—MDB) for the definition, master storage (master database) and administration of all process descriptions and network resources information models to be distributed throughout the platform for use within the Process Engines;

a distributed network-inventory layer that decouples the network from the management functions of the OSS and provides a database aligned in real-time with the network;

use of techniques of code mobility that enable a convenient distribution of applications, including the aspects of load balancing and fault tolerance.

OBJECT AND SUMMARY OF THE INVENTION

The Applicant has observed that the methods used in the systems described in the first two documents previously referenced present limits in terms of functions offered, which derive from three shortcomings.

In the first place, they do not provide a direct interaction with the systems/platforms responsible for network and service management, which would enable a significant reduction in the times of execution of problem-solving activities by exploiting the advantages related e.g. to real-time check of the correct execution of the jobs by the technical staff, proactive supply of the needed network data, and automatic execution of standard commands on the network.

In the second place, they do not represent the knowledge to be shared using formal tools (such as the workflows) that would enable a reduction in the working times of the technicians through an unambiguous and readily understandable description of the activities to be carried out. Such formal representation would also avoid any possible difficulties of interpretation or any misinterpretations, by the technicians, of the indications supplied, which can lead to the execution of activities that are useless or even harmful for the network on which they are operating.

Finally, the systems in question do not guide the technical staff in a complete, integrated and exhaustive way, through all steps to be followed for performing problem-solving activities: they provide punctual suggestions of individual activities to be performed or of specific documents to be consulted, derived by using methods such as Conversational Case-Based Reasoning. A complete guide would enable both a reduction in the working times for the technicians and a faster insertion of technicians that are new to the job.

Likewise, in the framework of systems/platforms for the network/service management, advanced solutions are available, which envisage agent-based distributed architectures.

In that respect, the architecture described in the third document referred to above is extremely effective and efficient in network management, but does not envisage any KM/OKM function to support activities of the workforce of a telecommunications operator.

There consequently clearly emerges the need to have available innovative solutions that, by overcoming the inherent shortcomings outlined in the foregoing, present some important functional features.

A first one of these features is the possibility of automatic and assisted interaction with the systems/platforms responsible for network/service management, the purpose of this being to enable:

real-time check, on the network/services managed, of the correct execution of the suggestions supplied, returning an immediate feedback to the user of the system;

automatic supply, synchronized with the activities performed, of the data (configuration data, measurement data, etc.) required to proceed with said activities;

automatic execution of the steps, considered standard, of the activity of a field engineer/operator: for example, configuration of a network card according to predefined parameters, to eliminate any possibility of error and reduce the times involved.

A second desirable feature is that the suggestions supplied to the workforce should be represented by formal tools (such as workflows) that have the following advantages:

description of the activities to be performed in order to successfully carry through a given intervention or to effectively deal with a customer request, in a unambiguous and readily understandable way;

immediate highlighting (for example, by means of appropriate scores) of the Best Practices; and enabling of a simpler management of the knowledge as regards the activities of upgrading and updating possibly supported also by automatic mechanisms.

Yet a further certainly desirable important feature is that the system should be able to autonomously and completely indicate all specific steps required for carrying out a given intervention (field engineers) or for responding to a given customer request (Call Centre advisors): they provide punctual suggestions of individual activities to be performed or of specific documents to be consulted, derived by using methods such as Conversational Case-Based Reasoning.

It may specifically be noted that the present management platforms, albeit in the vanguard as regards management aspects, do not offer adequate tools to support the workforce, who is still entrusted with carrying out important steps of the Business processes of a company, and are not integrated with OKM systems.

There is hence felt the need of having available solutions capable of overcoming these limitations. Specifically, there is felt the need of having available a complete solution to support the workforce which, starting from flexible and scalable advanced management architectures, will introduce innovative OKM functions, based upon a formal representation of the operational practices, and will ensure an integration between operation and network/service management.

The object of the invention is thus to provide a fully satisfactory response to the above needs.

The Applicant has found that the above object is achieved by providing a distributed architecture of intervention management proxy agents associated to respective operator's or user's terminal devices, said intervention management proxy agents being configured to interact with Resource Proxy agents associated with network equipments for generating instruction signals (in the form of workflows) for performing interventions on the network equipments, whereby the instruction signals are a function of the status of the network equipments requiring the intervention.

The invention also relates to a corresponding computer-program product, loadable into the memory of at least one computer and including software code portions for performing the steps of the method of the invention when the product is run on a computer. As used herein, reference to such a computer-program product is understood as being equivalent to reference to a computer-readable medium containing instructions for controlling a computer system for the purpose of co-ordinating execution of the method according to the invention. Reference to "at least one computer" is intended to highlight the possibility for the present invention to be implemented in a distributed and/or modular way. The claims form an integral part of the disclosure of the invention provided herein.

A preferred embodiment of the solution described herein is thus a method of generating instruction signals arranged in workflows for performing interventions on network equipments included in a communication network wherein said equipments are associated to Resource Proxy agents each responsible for managing a single equipment in said network, the method including the steps of:

providing a distributed architecture of intervention management proxy agents, and generating said instruction signals via said intervention management proxy agents in an interactive manner with said Resource Proxy agents, whereby said instruction signals are a function of the status of the equipment in said network on which said interventions are performed.

BRIEF DESCRIPTION OF THE ANNEXED DRAWINGS

The invention will now be described, purely by way of example, with reference to the enclosed plate of drawings, wherein.

DETAILED DESCRIPTION OF PREFERRED EMBODIMENTS OF THE INVENTION

In order to facilitate proper understanding of the principles underlying the invention, a glossary is here presented with explanation of some terms/acronyms used in this disclosure and in the annexed claims.

WFM (Work Force Management): in the context of a telecommunications operator, this is the software application/sets of software applications responsible for managing the workforce of said operator. In the specific context of interest, it is understood as being the application/sets of applications used for managing both the mobile workforce (field engineers) and the Call-Centre workforce.

Operator: this is a member of the company staff being part of the workforce, understood as mobile workforce (field engineers), as specialized workforce (back office staff) and as Call Centre advisors.

Manager Module—MM: this is a software application running on a host which communicates with the distributed agents for various co-ordination activities, such as distribution of workflow descriptions, call of the distributed agents to invoke an operation, administrative controls, etc.; it may include an appropriate and specialized Graphical User Interface (GUI).

Agent: this is an autonomous process with possible persistent state and requiring communication (for example, in a collaborative and/or competitive way) with other agents in order to fulfil its tasks. This communication may be implemented through asynchronous message exchange and by using well known languages (for example, the Agent Communication Language—ACL) with a well defined and commonly agreed semantics.

Proxy: this is a component (agent) through which it is possible to control or intervene on another managed object, for example a network equipment or a GUI in the context of support to operation.

Rule Engine: this is a system for separating process rules (logically and/or physically) from the control logic and sharing them across data stores, user interfaces and applications. A rule engine is basically a very sophisticated if/then statement interpreter. A rule engine is used to decide, at runtime, which rules to apply and how these are to be executed.

Workflow: this can be defined as the partial or full automation of a process, where documents, information or tasks are passed from one participant to another, according to a set of procedural rules. A workflow can be represented through a flowchart with a sequence of tasks and temporal and logical dependencies, among tasks including parallel or alternative branches. There are ad hoc languages, such as XPDL (XML Process Description Language), which enable formal description of the workflows.

Workflow engine: this is the component that possesses all information related to the procedures (workflows), steps in a procedure and the rules for each step. The workflow engine determines whether the process is ready to move on the next step. In other words, a workflow engine is a component for executing workflows.

Figure 1:
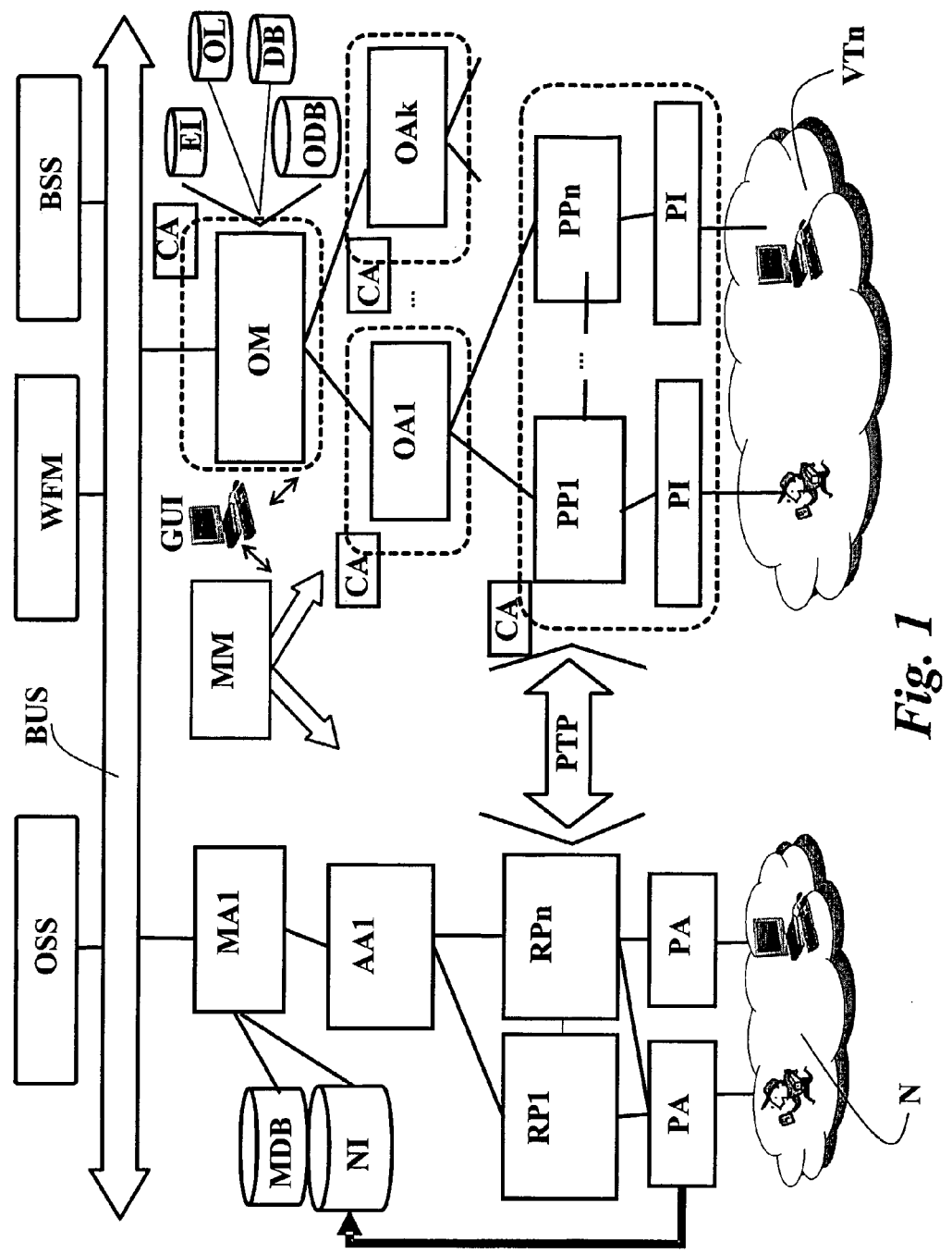
FIG. 1 is a functional block diagram illustrating a possible embodiment of a platform as described herein.

The block diagram of FIG. 1 represents a preferred embodiment of a platform that is an evolution of the platform for distributed management of a telecommunications network and related services, described in WO-A-2005/018249.

The architecture illustrated (which defines, in its higher layers, an Operations Support System (OSS)) interacts with three basic entities comprising other Operations Support Systems (OSSs), Business Support Systems (BSSs), and a Work Force Management (WFM) system (or possibly more than one WFM). As far as the management aspects are involved, the OSSs and the BSSs interact via a bus (BUS—e.g., a TIBCO bus) with the Master Application, designated by MA1. This application manage the distribution of processes and related data models, stored in the Model Data Base (MDB), to the various Agent Applications, one of which is shown and designated by AA1, and Resource Proxy Agents RP1, . . . , RPn. Each Agent Application relies on one or more Resource Proxy Agents RP1, . . . , RPn that interface with a communication network N via Protocol Adapters PAs. The Network Inventory NI corresponds to the usual concept of a network inventory component and is the collections of all virtualizations (images) of the resource in the network N; it is periodically updated retrieving information from the RPs. Additional details concerning this known solution or architecture can be derived from WO-A-2005/018249.

Figure 2:
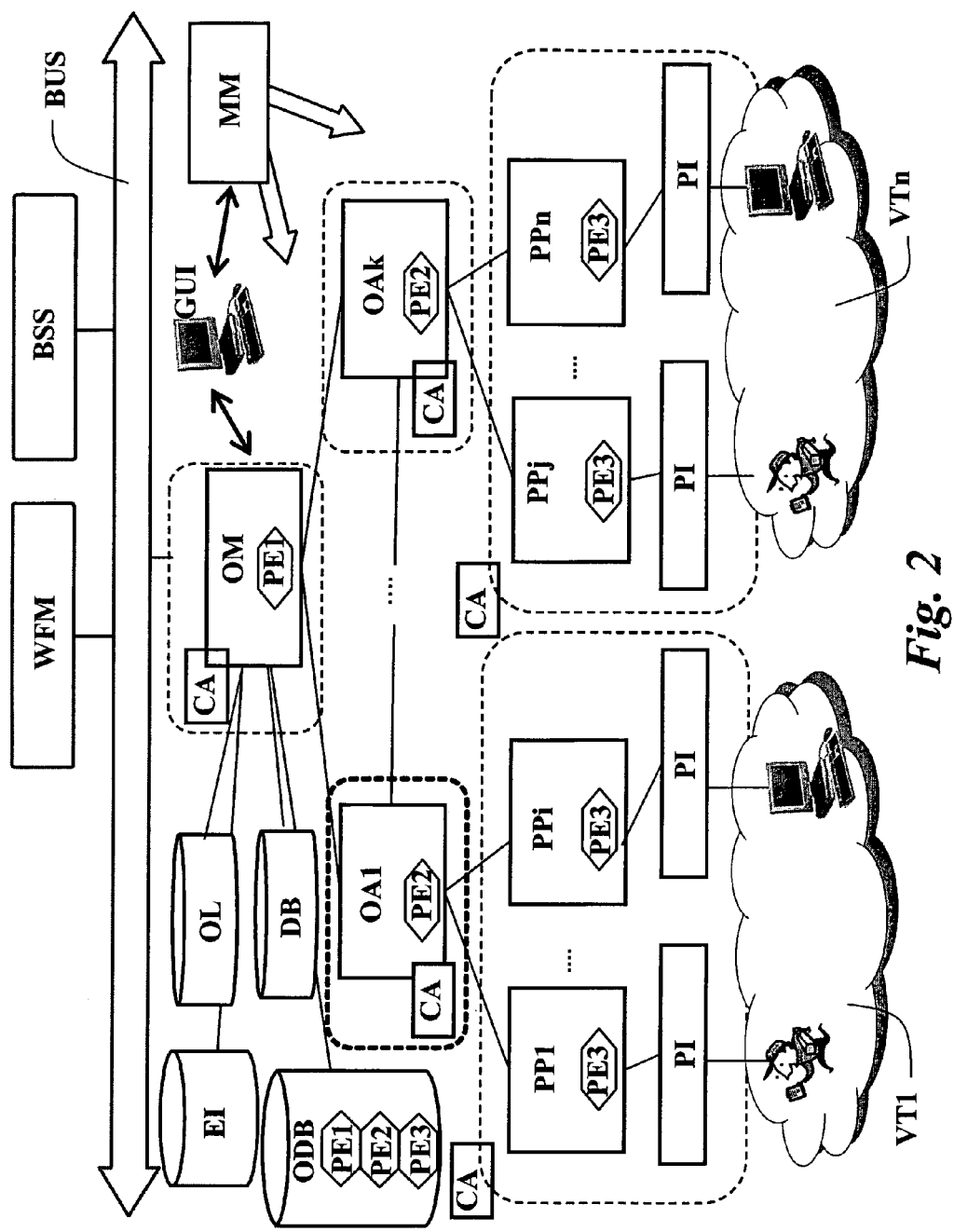
FIG. 2 is another functional block diagram representing operation management within the platform of FIG. 1.

As compared to the above known basic platform, the new elements introduced in FIG. 1 and presented in greater detail in FIG. 2 are an Operational Manager OM, which interfaces with the bus and co-operates with an Operation Data Base ODB, a Performance Data Base PDB, an Expertise Inventory EI and an Operation Log File OL. The Operational Manager OM supervises operation of Operational Agents OA1, . . . , OAk. Each Operational Agent relies on one or more Personal Proxies PP1, . . . , PPn, which interface with a plurality of Virtual Teams VT1, . . . , VTn through Personal Interfaces PIs. Each VT is made up of, for example, field engineers, back office staff, Call Centre advisors, or customers.

The Personal Proxies—$PP_1$, $PP_2$, . . . $PP_n$, each of which is equipped with a Personal Interface PI, are connected to the higher hierarchical layer of the architecture which includes either a set of Operational Agents $OA_1$, $OA_2$, . . . $OA_k$ or directly an Operational Manager OM. In case the OAs are present, these are, in turn, connected to the higher hierarchical layer which includes the OM. This layered architecture ensures flexibility and scalability of the functions, as described in what follows.

The PPs are also connected to one another, and to the Resource Proxies RPs, as schematically indicated by the double-headed arrow PTP in FIG. 1. This typically represents a peer-to-peer relationship between the Personal Proxies and the Resource Proxies. This relationship enables the possibility for the architecture herein described of generating instruction signals via the intervention-management proxies (i.e., the Personal Proxies) in an interactive manner with the Resource Proxies, so that these instruction signals depend upon the status of the equipment on which an intervention is executed. Persons skilled in the sector will readily appreciate that reference to the possible presence of n Resource Proxies RP1 to RPn, n Personal Proxies PP1 to PPn, and n Virtual Teams is thoroughly purely indicative, in that each of these entities can conceivably be present in any number.

Each RP is responsible for the creation, maintenance and management of the so-called "image" of an individual equipment (located in the network or at the customer's premises). The image is a representation of the configuration of the equipment according to a defined data model.

Each Operational Agent OA1, . . . , OAk co-ordinates a set of Personal Proxies; the Operational Agents OA1, . . . , OAk can interact with one another, as well as with the Personal Proxies and the Operational Manager OM.

Each host running agent (i.e., each agent for the network/service management and each new agents such as Personal Proxies, Operational Agents and Operational Manager) preferably includes one or more Control Agents CAs, which are the software modules responsible for controlling and managing the platform.

As has been seen, the platform also comprises a set of DBs in support of the activities performed by the various components. The Operational Data Base ODB is the single (logical) point of definition and storage of all functional aspects and the aspects of management/support of workforce and customers, related to the platform. The ODB is the repository of the process descriptions (wherein a process description is either a workflow or a rule) and of the data model definitions that are used by the components of the platform for managing the operation (PP, OA and OM).

A Manager Module MM, via the Control Agents CA, distributes the process definitions and the data model definitions to the operation-management components. In the first place, this enables the most efficient and effective operational practices (Best Practice) to be made available to the entire workforce and to the customers. In addition, through a spread of the data model definitions, co-ordination among the members of the workforce is enabled, thus allowing simple and fast identification of experts to be referred to for obtaining support on a specific subject. Associated to the Data Base ODB is a purposely provided GUI that will enable its population.

The Model Data Base MDB stores all process descriptions (workflows and rules) and the models of the data processed (including the models of the network equipment), which are used by the components of the platform for network/service management (RPs, AAs and MA as shown in FIG. 1)

This element provides the users with a single point in which to define and administrate the functions of the platform as regards the aspects of network/service management.

In a preferred embodiment, in order to define the data models stored in the data bases ODB and MDB, the SID model (Shared Information Data model, suite of documents of the TeleManagementForum GB922 Release 4.0, August 2004 and release 4.5 in Member Evaluation—December 2004) is used.

The Performance Data Base PDB is a single (logical) point of storage of all performance data related to the platform components and it is used both to optimize the resources usage and to identify the Best Practice.

Finally, also present in the platform are: the Operational Log, which is a single (logical) point of storage of all recordings of the activities performed by the operators and by the customers; and the Expertise Inventory EI, which contains the data of the operator profiles and of the customer profiles managed by the various PPs.

The operational processes of the platform are segmented into three layers with specific functions. This choice is intended to meet two needs: keeping the number of layers as low as possible (thus avoiding the complexity of conventional architectures), and allowing free allocation of processes between a distributed and a centralized modality. This implies the presence of a centralized layer 1 (that corresponds to the Operational Manager OM) and a fully distributed layer 2 (that corresponds to the Operational Agents OA1, . . . , OAk) plus one independent proxy layer 3 (that corresponds to the Personal Proxies PPs) that decouples the operation from the management and control functions. This segmentation also provides different service views, for example a view of product to the end customer at layer 1, a view of service at layer 2 and an operational view at layer 3. As will be explained later, the components PP, OA, OM are adapted to perform respective functions based on respective instruction information provided to them, which information comprises process definitions, such as workflows or rules, or data models definitions.

Each Personal Proxy PP (in what follows, for reason of brevity, we shall avoid repeating each time the sequence of suffixes 1 to N e.g. in PP1, . . . , PPn, and a similar approach will be adopted also with reference to the other entities present in a multiple form in the diagrams of FIGS. 1 and 2) is responsible for supporting the activities of a specific operator or of a specific customer, in terms both of guide in the various operational activities and of support to the co-operation (among different operators or between operators and customer). In particular, support to co-operation is based upon the operator profiles and the customer profiles, these profiles being represented in the data model. Instantiation of the profiles with the real and updated data is carried out by the Operational Manager OM with the information coming from external WFM systems, in case of operator profiles, or from Business Support Systems, in case of customer profiles, and is communicated to the Personal Proxy.

In other words, each Personal Proxy plays the role of an intervention-management proxy agent. Each Personal Proxy (PP) executes processes typical of the corresponding PP level using a Process Engine PE: these processes are referred to as being layer-3 processes and can be structured in sublayers (for example, for the definition of macro-operations). The processes in the top layer of layer 3 constitute the services that the PP offers to the higher layer (Operational Agent and possible other external applications) via invocation of said processes. They represent the operations that correspond to a single activity performed by the operator/customer to which the PP is associated. Hence the term, already previously introduced, of "intervention management" proxy agent. Examples of services (and hence of interventions) provided by a Personal Proxy are: to perform a cross-connection, to install and configure a modem, to repair a failure of an equipment (router, DSLAM, etc.), etc.; each of these may include sequences of activities to be performed on one or more equipments. The processes in the bottom layer of layer 3 use the services offered by the Personal Interfaces PIs.

The operator profiles and customer profiles managed by a Personal Proxy PP are represented in the data model. This model, defined by means of a purposely provided GUI, is stored in the data base ODB and is distributed by the Manager Module MM, via the Control Agents CA, to the Personal Proxies PPs, which load it and instantiate it with the values sent by the Operational Manager OM and acquired by external systems (WFM and BSS). Again, the instantiation is performed in a flexible way by using a Proxy Engine PE. In this manner, changes and additions of data models (such as update of the operator/customer profile, introduction of new kinds of operator, etc.) do not require any appreciable software change in the components of the platform, achieving a high degree of flexibility.

The data of the operator profiles and of the customer profiles are stored in the Expertise Inventory EI, which is periodically updated by the OM by using information acquired from external systems (WFM systems for operator profile and business support systems for customer profile). As said before the changes in the profile data are also communicated to the Personal Proxies PPs concerned.

The operators can hence be logically grouped into Virtual Teams VT1, . . . , VTn: a Virtual Team includes a set of operators that share a given knowledge and/or that works on common problems. The Virtual Teams can, in general, be organized based on a geographical subdivision of the workforce in order to improve the efficiency of the problem solving and to optimize the field interventions.

The Personal Proxies PPs can directly interact with one another to provide support to co-operation among operators or between operators and customer, for example, to repair a complicated failure. The Personal Proxies PPs are also in communication with the Resource Proxies RPs associated to the different network resources; hence, the PPs can interact with RPs to issue commands, to gather configuration data, results of measurements or results of checks of successful execution, on the equipment, of some given actions by the operator/customer, and to make available a remote access to possible command line interfaces. The Personal Interfaces PI are instead responsible for management of the GUI toward all operators (members of the workforce) or customers, whatever the type of terminal device that they use to support their working activities (PDAs, laptops, desktops, etc.). Each PI offers, as services for the Personal Proxies, management of the GUI toward the operator/customer, including the automatic configuration of the GUI based on the available device type.

Each Operational Agent OA is responsible for co-ordination of a set of PPs and for execution of processes typical of layer 2 by using a Proxy Engine. These processes are related to the distributed execution of operational interventions and can be structured in sublayers. The processes in the top layer of layer 2 can be externally invoked; thus, these are the services offered by the Operational Agent OA to the Operational Manager OM or other external systems. The processes in the bottom layer of the layer 2 use the services (that is, they invoke processes) offered by the Personal Proxy PP.

An Operational Agent OA does not require software update to support new operational practices. This is due to the flexibility of the processes that are received from the Management Module MM, via the CA, loaded and executed by the OA layer. The Operational Agents OAs can interact via a Community Protocol (a interworking mechanism based upon exchange of messages) to support the distributed execution of operational activities correlated with one another, such as, for example, the creation of a circuit that involves equipment located in geographically distributed sites.

The Operational Manager OM is responsible for first-level co-ordination of the execution of the processes typical of a management level. The layer 1 processes can be structured in sublayers and are characterized for providing functions that require interaction with entities external to the platform (for example WFM systems or Business Support Systems) and/or co-ordination among Operational Agents OAs, which cannot be achieved in a easy or effective way just by the Operational Agents OAs. The great flexibility of the architecture also enables smooth evolution; for example an enhancement of the community protocol may enable migration of a process from layer 1 to layer 2

The Process Engines PE for any layer are intended to be a workflow (i.e., a flowchart) engine, a rule engine or a combination of the two. For example, supporting functions related to a field intervention of an operator are better represented as a flowchart whilst functions to support diagnosis on a complaint basis, in the context of a Call Centre, are better represented by a set of rules. Whenever possible and advisable, the use of workflows is preferred as it avoids the complexity of dealing with rule conflicts and rule management.

The Process Engines are preferably used by every component of the platform and, if possible, they are to be allocated on the same host on which the component itself resides in order to improve the performance levels: the Operational Manager OM, the Operational Agents OAs and the Personal Proxies PPs present a behaviour that is both reactive and proactive, reacting to events but also spontaneously initiating processes.

The Control Agents CA are responsible for the distribution of the workflows and of the data models on the various agents of the platform, for the measurement of the use of the resources and performance of the local agents (i.e., the ones that are executed on the host), and, finally, for the local optimization of the resource management. The measurements are sent to the Manager Module MM and to other Control Agents CA.

The mobility among hosts, managed by the Manager Module MM or by a Control Agent CA of the Operational Agents OAs and of the Personal Proxies PPs makes the procedures of deployment, load balancing and fault tolerance more efficient and automatic. If an agent for any reason "goes down", the solution can be to clone or move the agent toward another running host. The Manager Module MM, through the Control Agent CA, periodically controls the operational state of the Operational Agents OAs and of the Personal Proxies PPs for said purposes. In order to monitor performance, the components of the platform must be able to also monitor execution of the various processes. In case of the Personal Proxy PP, monitoring of the execution of the various processes is useful also in a perspective of identification of Best Practice.

As has already been said, the solution described herein is aimed to manage and support the operation of the workforce and of the customer. This is obtained through a set of services made available to the operators/customers.

With reference to the eTOM framework (documents: Tele-ManagementForum GB921 and GB921D, release 4.0, of March 2004 and release 5.0 in Member Evaluation, of April 2005), a first embodiment of the solution described in the present invention provides support to operators and customers that carry out activities referring to the following Level 1 vertical end-end process groupings:
  Infrastructure Lifecycle Management (process area: Strategy, Infrastructure & Product);
  Operations Support & Readiness (process area: Operations);
  Fulfillment (process area: Operations);
  Assurance (process area: Operations).

Considering now the horizontal dimension of the eTOM framework, the Level 1 horizontal functional process groupings in which the activities of operators and customers fall are:
  Resource Development & Management (process area: Strategy, Infrastructure & Product);
  Customer Relationship Management (process area: Operations);
  Service Management & Operations (process area: Operations); and
  Resource Management & Operations (process area: Operations).

Management and sharing of the operational knowledge toward operators and customers can, in turn, fall in the process area Enterprise Management and, in particular, to the Level 1 process grouping known as Knowledge & Research Management.

Figure 3:
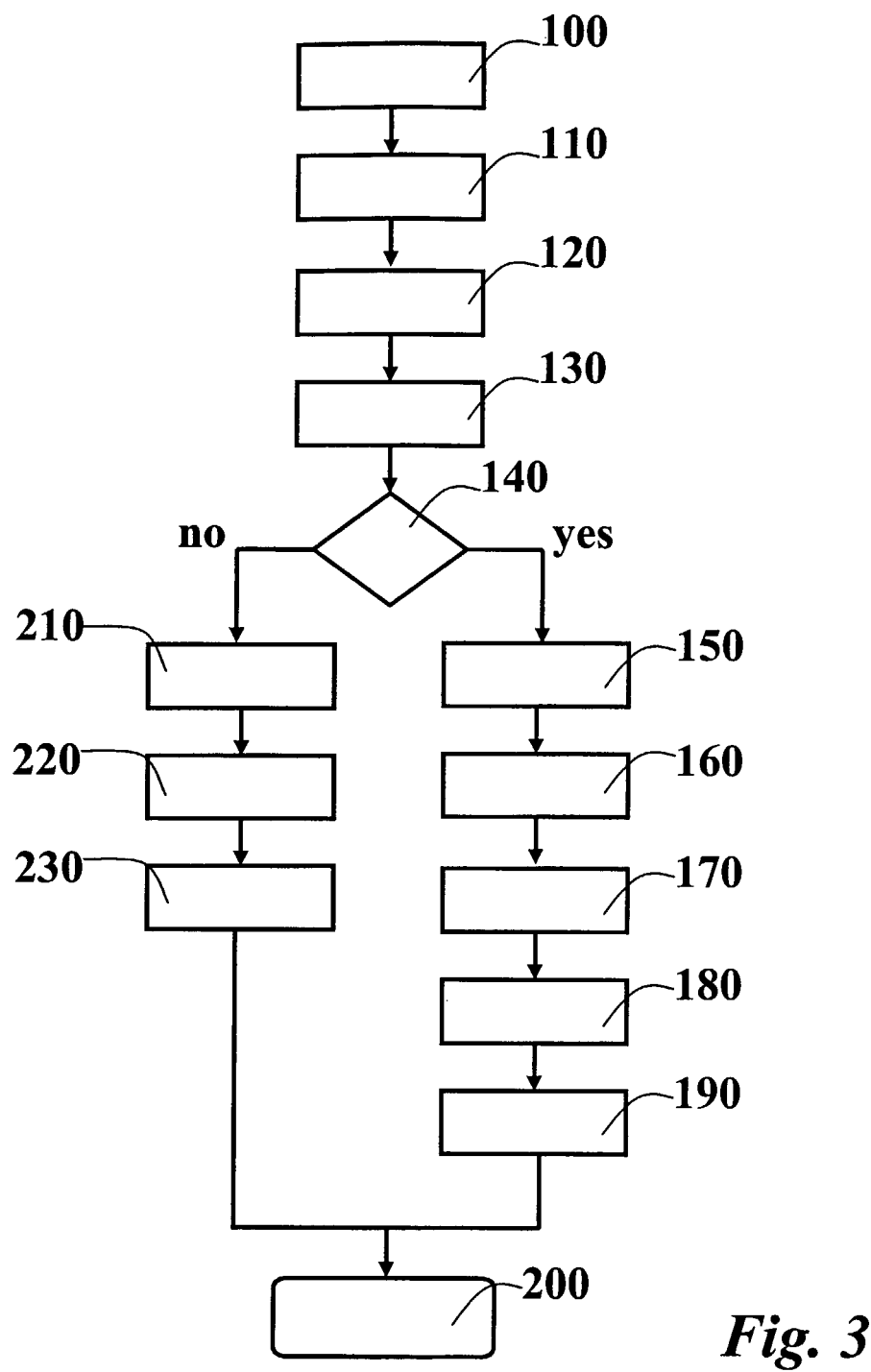
FIG. 3 is a flowchart of a first procedure performed within the solution described herein.

The flowchart of FIG. 3 shows, by way of example, a procedure to support field engineers.

In the first place, the platform described above guides the operator, entrusted with carrying out a given activity, showing to him the punctual activities to be performed; the operational ways with which the platform offers said service with reference to field engineers are presented in FIG. 3 and described hereinafter.

Downstream of the selection by the field engineer of the intervention to be carried out (step 100), the Personal Proxy associated to him displays (step 110) on the field engineer's terminal device, by using the corresponding interface PI, instruction signals organized as workflows aimed to repair a failure or to execute a Work Order, related, for example, to activities of Provisioning or Operation (such as database updates, etc.). Displayed on the field engineer's device is a specific selection of workflows, which guide him in the execution of the intervention according to practices that are alternative to one another. The individual workflows contain all information necessary to the field engineer for performing the specific intervention, including possible specific data regarding the intervention itself, such as the ones required to identify the component of an equipment on which to operate: for example, if a step of a workflow guides the field engineer in the activity of changing a card of an equipment, said step contains also the indication that enables the field engineer to identify in a easy and unique way the card to be changed. Each workflow is presented, indicating also the score which has been assigned to it and which reflects an ascertained evaluation of the effectiveness and efficiency of the workflow itself in order to better achieve the target of the intervention. Said score also determines the order of presentation of the workflows (listed starting from the one with the highest score).

Before deciding whether to select one of the workflows indicated, the field engineer can request the Personal Proxy PP to gather measurement data or to provide information on the equipment configuration. The request entails an exchange of information between the Personal Proxy PP and the Resource Proxy RP, with the request of the field engineer forwarded from the Personal Proxy PP to the Resource Proxy RP and the corresponding reply, sent by the Resource Proxy RP to the Personal Proxy PP, presented to the field engineer through the interface PI (the entire activity corresponds to step 120).

In addition, the field engineer can also requests that one or more of the proposed workflows should be displayed (step 130) so as to have further information before deciding how to proceed. The field engineer can then decide (step 140) to select one or none of the presented workflows; in case of selection, there is the activation on the PP of the workflow chosen (step 150).

Downstream of the activation of a workflow, a process of recording all activities performed by the field engineer is started (step 160). Information gathered are stored in the operational log OL and can be then processed for refining the existing workflows or for the purpose of generating and validating new workflows.

In parallel to activation of the workflow on the Personal Proxy PP there is the activation on the Resource Proxy RP that manages the equipment on which the field engineer must operate of a co-operative workflow that co-operates with the one on the Personal Proxy (step 170). It is the workflow on the Personal Proxy PP itself which, as first step, activates a specific 'co-operative' workflow on the Resource Proxy RP. The two workflows are executed in an independent way, except for co-ordination on some points in which they can use mechanisms of mutual waiting for interchanging processing results. Some examples of interchanges of information are given in the following.

There may then be exchanges of information (step 180) between Personal Proxies PPs and Resource Proxies RPs for sending, from Resource Proxies RPs to Personal Proxies PPs:

possible data on the configuration of the equipment, or results of measurements on the equipment, on which the field engineer is intervening, which are required to execute the subsequent steps of the workflow. These data are sent automatically, without any request by the field engineer, as the Resource Proxy RP is synchronized with the activities that are being performed and knows both the times involved and the type of required information;

the indication that the configuration activities autonomously performed by the Resource Proxy RP in appropriate points of the workflow have actually been carried out;

the results of the check, autonomously performed by the Resource Proxy RP, of the successful execution of the intervention by the field engineer (in case of failure, check of its repair, in case of Provisioning Work Order, check of the correct execution of the requested configuration activities).

Following upon the reception by the field engineer via the Personal Proxy PP of the indication, coming from the RP, of the successful conclusion of the intervention (step 190), the intervention is considered closed (step 200), and the field engineer can select a subsequent intervention.

In case where a field engineer decides not to select any of the workflows proposed to him, or else if there does not exist any workflow associated to the intervention to be performed, the field engineer can in any case request, via the Personal Proxy PP, which, in turn, interfaces with the appropriate Resource Proxy RP, information, measurements or execution of commands on the equipment on which he must operate, also by providing a remote access to the Communication Line Interface (CLI) of the equipment. This is done as support to the execution of the intervention (step 220) and/or as check of the correct execution thereof (step 230), prior to closing the intervention (step 200). In addition, all activities performed by the field engineer are recorded (step 210), and information gathered are stored in the Operational Log and can be processed subsequently for the purpose of generating and validating new workflows or for refining existing workflows.

The technician who has chosen to follow the steps indicated by one specific workflow can interrupt at any one point the execution of the workflow itself and proceed without any longer being guided, interacting with the equipment (via the chain between Personal Proxies PPs and Resource Proxies RPs) to obtain information and/or to carry out actions on the equipment itself.

Figure 4:
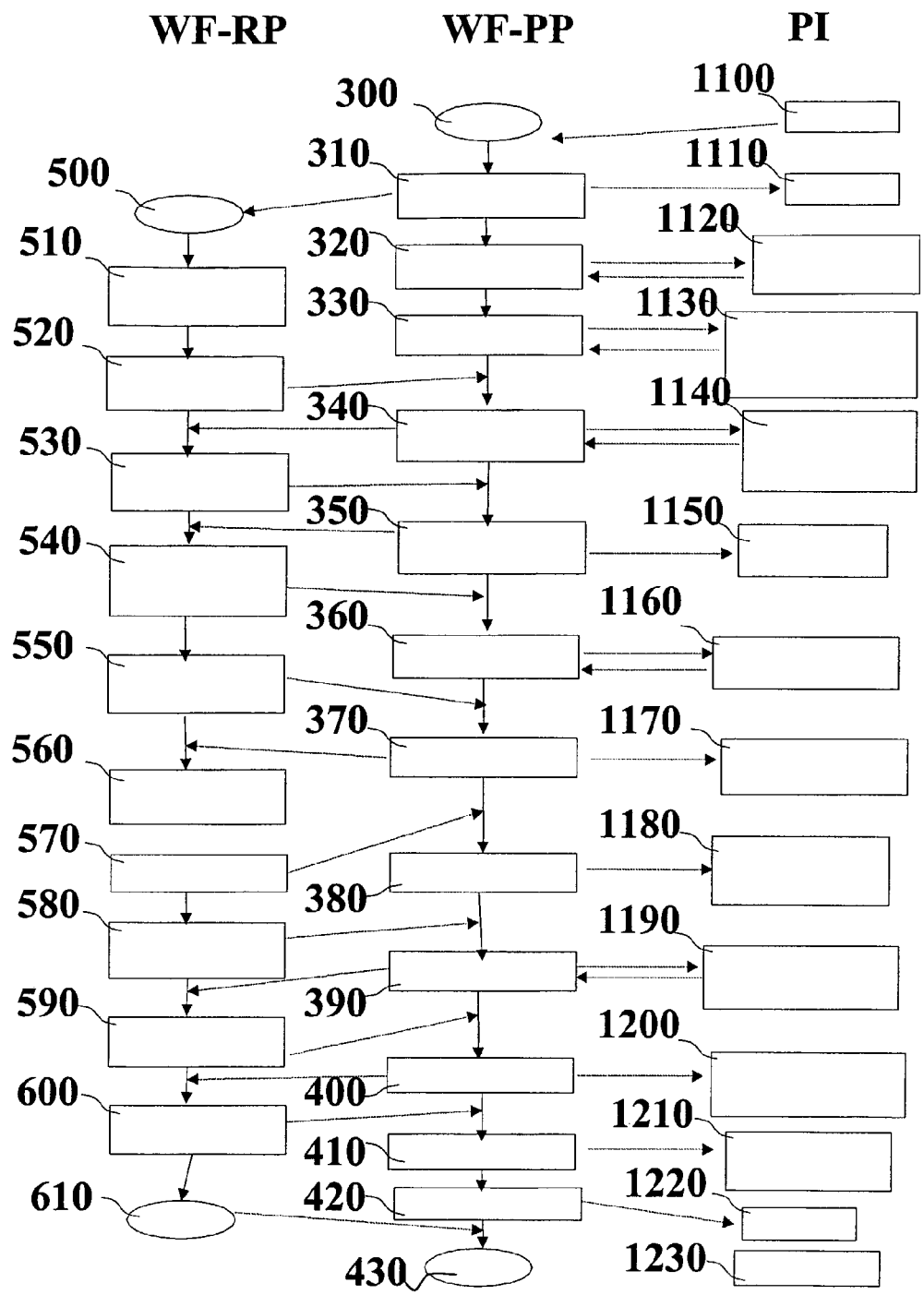
FIG. 4 is an example of a workflow as generated by the solution described herein.

For instance, FIG. 4 presents an example of co-operative workflow for replacement of an equipment card. In particular, FIG. 4 in question presents an example of co-operative workflow aimed at guiding the fields engineer in an activity of replacement of a card on an equipment.

The field engineer, downstream of the choice of the workflow to be activated according to the criteria previously described, require the start-up, via the interface PI, of the selected workflow on the Personal Proxy PP (step 1100).

The workflow at the Personal Proxy PP end starts (step 300) and, as first action, it starts the related co-operative workflow on the Resource Proxy RP (step 310). The field engineer is sent a message on the interface PI for awaiting start-up of the RP workflow (step 1110).

The Personal Proxy PP workflow proceeds with the activities preliminary to replacement of the card, indicating to the field engineer the instructions for opening the equipment (step 320) via description on the interface PI of the manual operations to be performed (step 1120) and the indications for identifying the card within the equipment (step 330), once again via display on the interface PI (step 1130), also through the aid of schemas that facilitate identification of the card.

At the same time, the Resource Proxy RP workflow proceeds with the management activities introductory to the replacement of the card (step 510), such as, for example, deactivation or shifting of services still active thereon or setting the card in a non-operational state. When said activities have gone through, the Resource Proxy RP workflow notifies the Personal Proxy PP workflow that it can proceed (step 520).

The Personal Proxy PP workflow notifies the field engineer to disconnect the wiring for the card that is being replaced (step 340), presenting useful information for manual activity on the interface PI (step 1140), whilst it notifies the Resource Proxy RP workflow to proceed with the next step of supervision of the activity (step 530), such as, for example, check of whether the involved physical ports signal the state of wiring disconnected. When all wiring of the card to be replaced has been disconnected, the Resource Proxy RP workflow notifies the PP workflow (step 530).

The Personal Proxy PP workflow proceeds with the check on whether the card is ready for removal from the equipment (step 350), advancing the Resource Proxy RP workflow onto the activity of card release (step 540) and indicating to the field engineer to verify the card released signal (step 1150).

When the Resource Proxy RP workflow completes the activities of card release, as, for example, setting the card in power-down, it notifies the Personal Proxy PP workflow (step 540), which proceeds with the action of actual physical removal of the card (step 360), indicating to the field engineer the manual activities to be performed (step 1160), such as release levers to be activated and indications of the practices to remove the card.

The Resource Proxy RP workflow supervises the manual activity, checking the state and signals coming from the equipment (step 550), such as, for example, the state of slot free, and notifies the Personal Proxy PP workflow when the card is no longer present.

The Personal Proxy PP workflow, having received the messages of completion of the activities both from the Personal Proxy PP workflow and from the field engineer via the interface PI, proceeds with the action of insertion of the new card (step 370), sending the information necessary to the interface PI (step 1170) and notifying the Resource Proxy RP workflow. The latter supervises insertion of the new card (step 560), for example, by checking whether the slot has passed from the free state to the occupied state, up to notification to the Personal Proxy PP workflow of the correct insertion of the new card (step 570).

The Resource Proxy RP workflow proceeds with the checks and configuration of the new card (step 580), whilst the Personal Proxy PP workflow awaits completion of the latter activity (step 380) and notifies the field engineer via the interface PI of the check in progress (step 1180).

At the end of the configuration of the new card, the Resource Proxy RP workflow notifies the Personal Proxy PP workflow (step 580) to proceed with connection of the wiring (step 390), via presentation to the field engineer on the interface PI of the manual activities to be performed (step 1190) with the aid of schemas regarding the type of card and wiring.

During connection of the wiring, the Resource Proxy RP workflow supervises the ports of the card (step 590), for example controlling the state of the ports envisaged that indicates wiring connected. Only when all wiring envisaged has been reconnected, the Resource Proxy RP workflow notifies the Personal Proxy PP workflow (step 590) and proceeds with the checking and configuration of the ports (step 600), such as, for example, re-activation of the services or their transition from the temporary configuration previously executed (step 510).

The Personal Proxy PP workflow awaits completion of the configurations of the ports of the new card (step 400) and notifies the field engineer via the interface PI (step 1200) that said activity is in progress. Once the configuration of the ports is completed (step 600), the Resource Proxy RP workflow notifies the Personal Proxy PP workflow and ends (step 610), whilst the Personal Proxy PP workflow guides the field engineer to carry out closing of the cabinet of the equipment (step 410) providing appropriate information on the interface PI (step 1210).

Finally, the Personal Proxy PP workflow completes its execution (step 420), notifying the field engineer that end of the workflows is being awaited (step 1220) and waiting for completion of the Resource Proxy RP workflow. The workflows end, synchronizing on the last action of the PP workflow (step 430), with information to the field engineer of intervention successfully concluded (step 1230).

Figure 5:
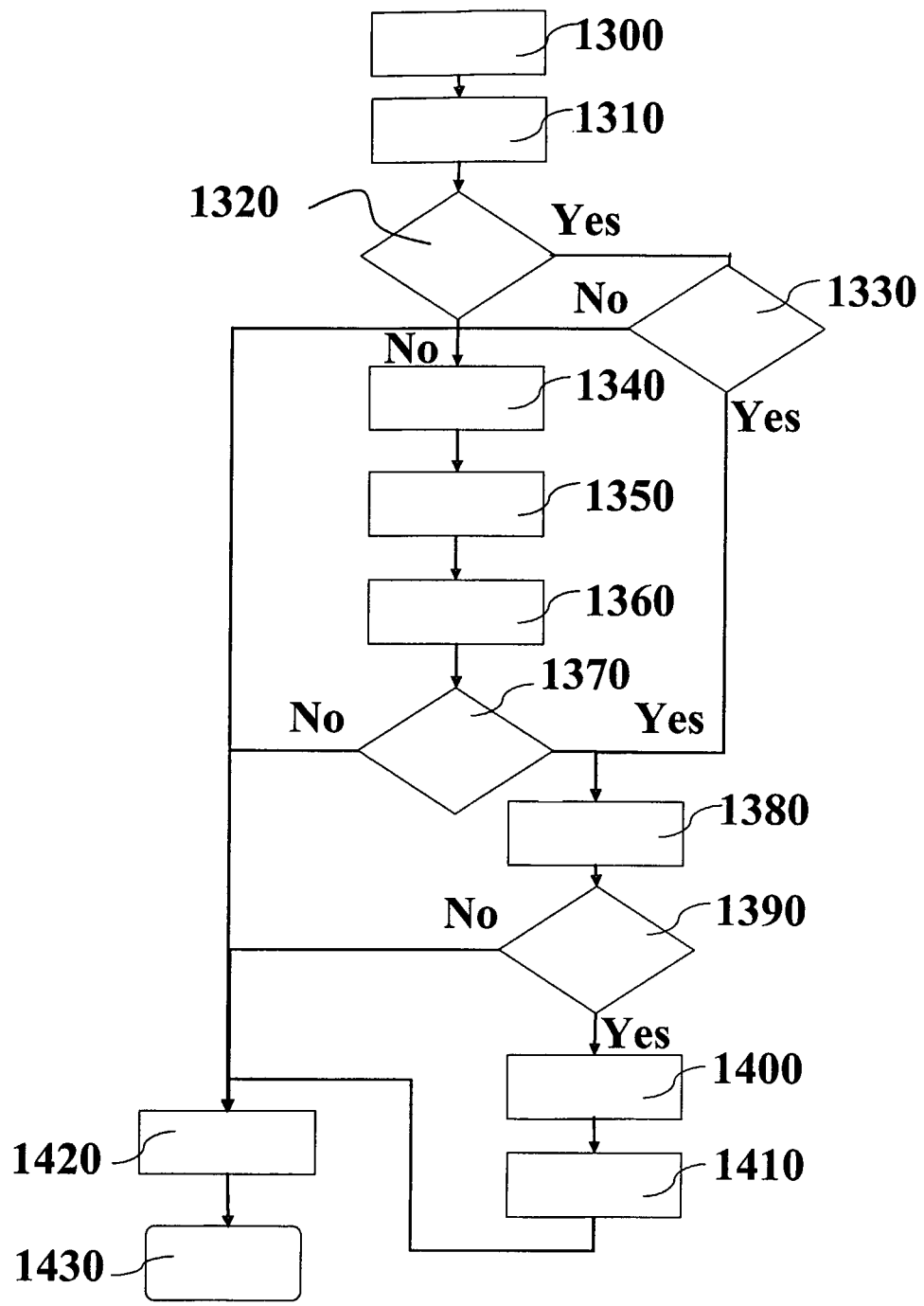
FIGS. 5 to 7 are flowcharts of further procedures performed within the solution described herein.

FIG. 5 illustrates, instead, an example of procedure to support Call Centre advisors: the solution described here in fact enables application of the guide service also to Call Centre advisors.

Following upon receipt, by the Call Centre advisor, of a customer complaint (hereinafter referred to as Trouble Report: TR) or of a request for a new service (hereinafter referred to as Customer Order: CO) (step 1300), the Personal Proxy PP associated to the Call Centre advisor opens a session with the Resource Proxy/Proxies RP associated to the network equipments of interest for the customer request and collects information required for its interaction with the customer (in case of a Trouble Report, it is checked if there are failures on the equipments involved in the customer service offer) (step 1310).

Following upon gathering of the data from the network, if the Personal Proxy PP does not require any further information (check made in step 1320) and is dealing with a customer complaint (check made in step 1330) the data gathered are processed in order to carry out a first diagnosis (step 1380). If, instead, the Personal Proxy PP does not require further information (check made in step 1320) and is dealing with a request for a new service (check made in step 1330), the next step is the creation of a Work Order (WO) (step 1420).

Following upon gathering of the data from the network, if the Personal Proxy PP requires further information (check made in step 1320), it displays on the device of the Call Centre advisor (step 1340), by using the corresponding interface PI, a sequence of questions aimed at acquiring further details on the TR/CO of the customer. In case of Trouble Report said questions may also be requests to the customer to perform punctual checks/actions, which can lead to solving the problem that is the cause of the Trouble Report, for example, requests to verify of whether all wiring of a Customer Premise Equipment (CPE) is properly connected and proceeding to correct connection of the wiring on which connection faults are detected.

The Call Centre advisor, by interacting with the customer, supplies the Personal Proxy PP with the appropriate answers to the questions put to him (step 1350). In case where the customer is not able to provide the requested data or in order to integrate the data provided by him, the Call Centre advisor can ask the Personal Proxy PP to gather measurement data or to supply him with configuration information related to the network portion of interest for the specific customer. This entails an exchange of information between the Personal Proxies PPs and the Resource Proxies RPs that control said network portion, with the request of the Call Centre advisor forwarded by the personal proxy PP to the Resource Proxy RP and the corresponding replies sent by the Resource Proxy RP to the Personal Proxy PP and shown by the latter to the operator through the interface PI (the entire activity corresponds to step 1360).

At the end of the sequence of questions or, in case of a Trouble Report, downstream of the solution of the Trouble Report itself based on a check/action of the customer (check made in step 1370), the next step is step 1420.

In case of a Trouble Report (check made in step 1370) by the customer, at the end of the step of guided gathering of the data (from the customer and/or from the network) the Personal Proxy PP, by using a rule-based system, formulates a first hypothesis on the root cause of the Trouble Report (step 1380).

If the failure can be repaired by the customer (check made in step 1390), the Personal Proxy PP of the Call Centre advisor opens a session with the Personal Proxy PP of the customer, asking it to execute a specific workflow to solve the Trouble Report (step 1400). The Call Centre advisor can then pass on to the execution of other activities, at the same time being informed on the outcome of the execution of the workflow by the customer.

On receipt of the outcome of the workflow (step 1410), an appropriate Trouble Ticket (TT) is created, which will take into account the outcome of the workflow (if the workflow has been successfully executed, the TT will record the solution of the Trouble Report; otherwise, it will contain information useful for creating one or more Work Requests WR toward the field engineers).

If the failure cannot be solved by the customer (check made in step 1390) the next step is creation of a Trouble Ticket (step 1420). Following upon gathering of the data on Trouble Report/Customer Order and, in case of Trouble Report, downstream of the first-level diagnosis and/or of the solution of the Trouble Report, the Personal Proxy PP provides the Call Centre advisor with all data required to create a Trouble Ticket or a Work Order, which, in case of a customer request not yet satisfied, will produce in one or more Work Requests WR toward the field engineers (step 1420). Downstream of the creation of the TT/WO, the activity of the Call Centre advisor ends (step 1430).

Figure 6:
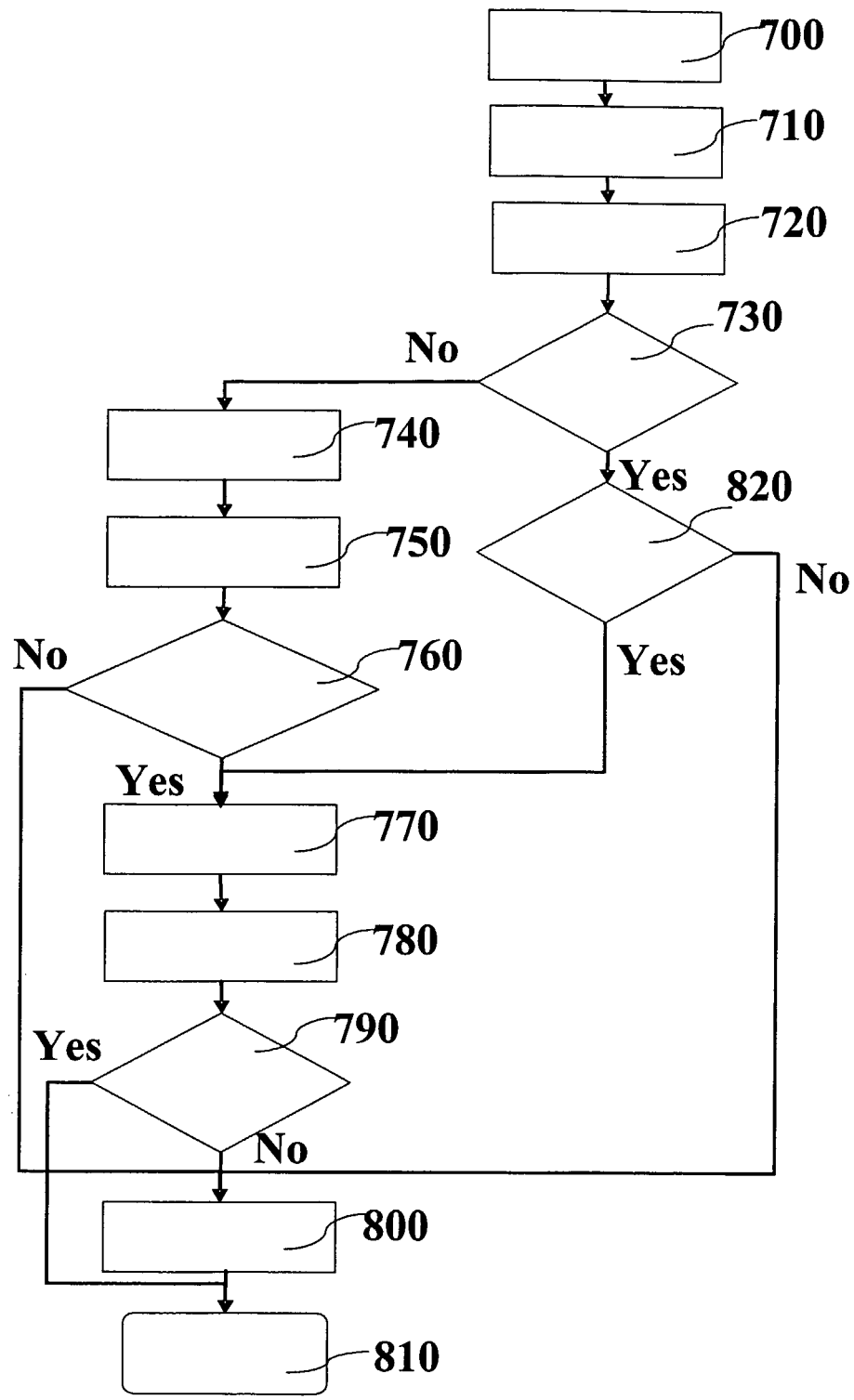

The flowchart of FIG. 6 refers, instead, to a procedure to support customers; the support to the execution of operational activities described here also applies to the customer.

Following upon detection, by a customer, of any malfunction (step 700) the customer himself activates on his device (typically a PC or PDA) the Personal Proxy PP associated to him (step 710).

The Personal Proxy PP opens a session with the Resource Proxy/Proxies RP associated with the equipments located at the customer premises, in order to identify any possible failures on said equipments (step 720). In case where no failures are present on the equipments at the customer premises (check made in step 730), the Personal Proxy PP displays on the customer's device (step 740), using the corresponding PI interface, a sequence of questions aimed at acquiring further details on the malfunction detected. The customer provides the Personal Proxy PP with the appropriate answers to the questions put to him (step 750).

At the end of the sequence of questions, the Personal Proxy PP checks whether the cause of the malfunction has been identified and whether said cause can be removed by the customer (check made in step 760) and, if so, activates an appropriate workflow (step 770), which guides the customer in solving the problem. The Personal Proxy PP also activates a process of recording of the customer activities (step 780): the information gathered is stored in the Operational Log and can be subsequently processed for refining the existing workflows or in order to generate and validate new workflows.

At the end of the workflow, a check is made, by the customer, on the removal of the malfunction (step 790); if said check has a positive outcome, the activity of the customer ends (step 810). If, instead, the check has a negative outcome, the Personal Proxy PP notifies the customer to contact the Call Centre (step 800); downstream of the notification by the Personal Proxy PP, the activity of the customer ends (step 810). If the cause of the malfunction has not been identified or else if it cannot be removed by the customer (check made in step 760), the Personal Proxy PP notifies the customer to contact the Call Centre (step 800). Following upon said notification by the Personal Proxy PP, the activity of the customer ends (step 810).

In case where there are failures on equipments at the customer premises (check made in step 730), the Personal Proxy PP carries out a further check to verify whether said failures can be repaired by the customer (check made in step 820) and, in case of a positive outcome, activates an appropriate workflow (step 770), which guides the customer in solving the problem.

The Personal Proxy PP also activates a process of recording of the customer activities (step 780): the information gathered is stored in the Operational Log and, as already mentioned, can be processed in order to refine existing workflows or to generate and validate new workflows. At the end of the workflow, a check is made, by the customer, on removal of the malfunction (step 790); if said check has a positive outcome, the activity of the customer ends (step 810). If, instead, the check has a negative outcome, the Personal Proxy PP notifies the customer to contact the Call Centre (step 800); downstream of the notification by the Personal Proxy PP, the activity of the customer ends (step 810).

The workflows executed on the Personal Proxy PP of the customer usually envisage that the customer will be informed also of possible actions carried out automatically by the Resource Proxies RPs and that he can grant an explicit consent to their execution.

Figure 7:
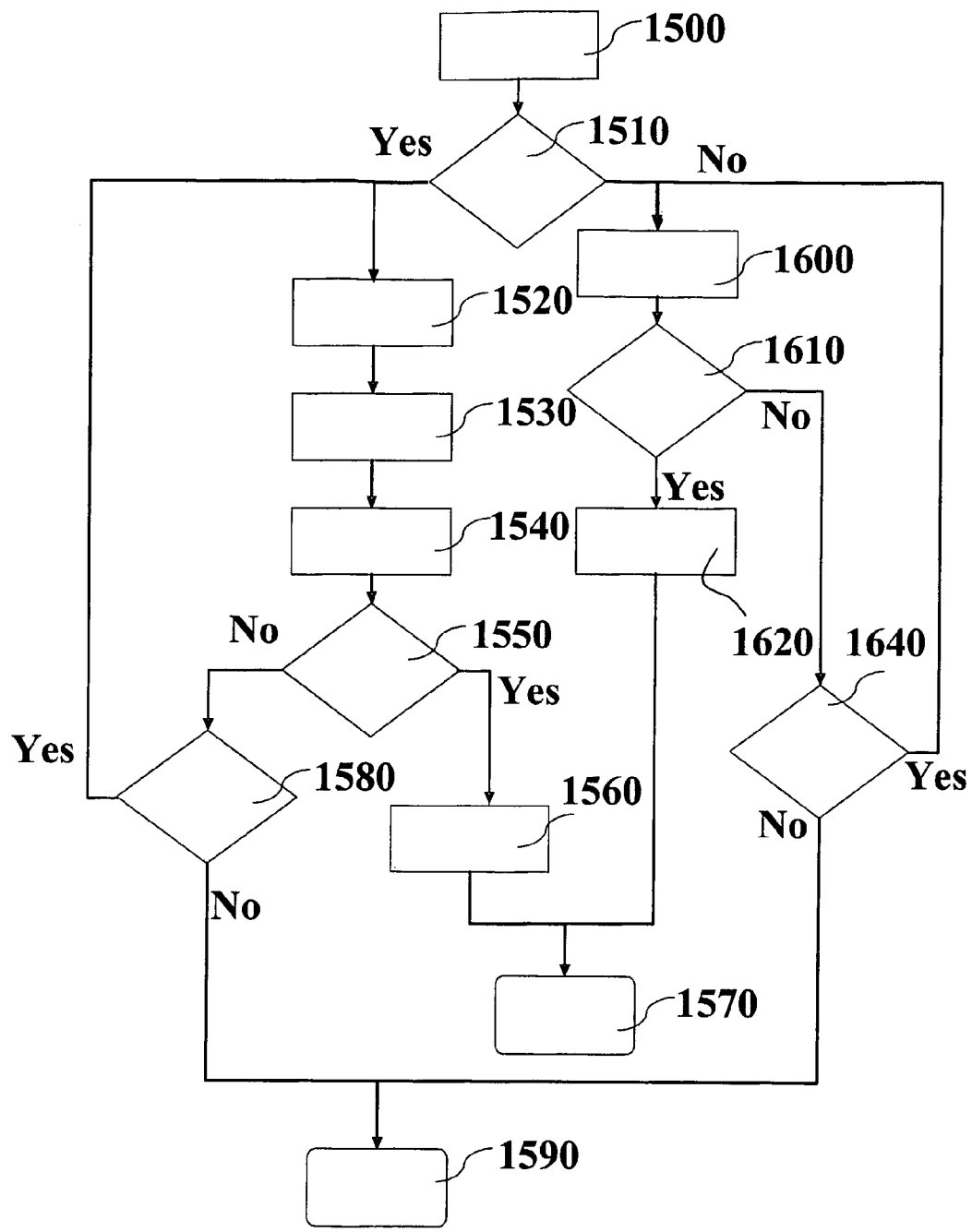

The flowchart of FIG. 7 illustrates a procedure for co-operation among operators. The platform described here in fact provides a further service to support the operator, entrusted with carrying out a given activity (for example an in-field intervention or handling of a customer request), managing the interactions with possible other operators or between an operator and a customer.

The operational practices adopted for interaction among operators are described in the following.

The Personal Proxy PP autonomously (for example, downstream of detection of an intervention that has been unsuccessful in case of field engineers) or upon notification by the operator, decides to activate a session toward the Personal Proxies PPs of other operators (step 1500).

In case of automatic activation (check made in step 1510), the Personal Proxy PP, based on the knowledge of the type of activity that the operator is performing (inferred from the available data or deriving from an explicit indication of the operator) and of the macro-skills required to carry it out, attempts to activate a session using an orderly list of names of operators to be contacted, organized according to macro-skills (step 1600).

If the activation is not successful (check made in step 1610) the Personal Proxy PP checks with the operator (step 1640) whether to proceed in its attempt to activate a session, or to stop. If the operator decides to continue, the Personal Proxy PP makes another attempt to activate a session with the next name in the list (step 1600) and proceeds iteratively until it manages to activate a session or until the operator decides to interrupt the procedure. In the latter case, the Personal Proxy PP ends the session-activation procedure (step 1590).

If activation is successful (check made in step 1610), a session is started among operators, in which the personal proxy PP makes available a set of tools for co-operative work, such as making visible to both operators all data on the activity to be carried out and on the steps already carried out or to share possible network data that the operator, who has requested the support, had already acquired (step 1620).

Upon notification of the operator, the Personal Proxy PP then proceeds to close the session (step 1570).

In case of activation upon request by the operator (check made in step 1510), the Personal Proxy PP, based on the knowledge of the type of activity that the operator is carrying out (inferred from the available data or deriving from an explicit indication of the operator) and of the macro-skills required for carrying it out, presents (step 1520) an orderly list of names (the order is the one that the Personal Proxy PP would follow if it had to activate the session autonomously), amongst which the operator selects the desired one (step 1530).

Downstream of selection of the name by the operator, the Personal Proxy PP attempts to set up a session toward the Personal Proxy PP associated to said name (step 1540). If activation is unsuccessful (check made in step 1550), the Personal Proxy PP checks with the operator (step 1580) whether to proceed with the attempt to activate a session, or to stop. If the operator decides to continue, the Personal Proxy PP once again displays the list of names, appropriately updated in order to take into account the unsuccessful attempt/attempts (step 1520) and proceeds iteratively until it manages to activate a session or until the operator decides to interrupt the procedure. In the latter case, the Personal Proxy PP ends the session-activation procedure (step 590).

If the activation is successful (check made in step 1550), a session among operators is started up, in which the Personal Proxy PP makes available a set of tools for co-operative work, of the type already previously considered (step 1560). Upon notification of the operator, the Personal Proxy PP then proceeds to close the session (step 1570)

The interaction between customer and operator uses mechanisms similar to the ones referred to above for interaction among operators; in this case, it is possible to hypothesize that the co-operation will usually involve the customer and a Call Centre advisor and that it will be the Personal Proxy PP of the customer, upon request of the customer himself or autonomously, which will set up a session. Also in this case, the customer can decide to interrupt the attempt to set up a session with an operator at any moment. In case of a customer request, the Personal Proxy PP presents the customer himself with the orderly list of names of Call Centre advisors and allows the customer to select the advisor to be contacted.

In order to offer the services exemplified above, the described platform maintains a set of data on the operators, on the customers, and on the workflows, and performs a dynamic management of the processes, to adapt both to operational changes (introduction of new workflows following upon introduction of new equipments, deletion of workflows referring to activities on equipments that are no longer in the network, etc.), and to changes of the characteristics and of the number of members of the workforce (introduction of new operators, update of the data of the operator profiles, etc.) and of the customers (introduction of new customers, update of the data of the customer profiles, etc.).

The operator profiles are defined based on a small number of standard basic profiles; said profiles specifies the macro-skills (for example network/service domains on which the operator can carry out activities: switching, transmission, ADSL access, etc.) of the operators and, for each macro-skill, the corresponding degree (it indicates how much the operator is skilled in a given field). The profile also highlights if the operator is a field engineer or a back office operator, or a Call Centre advisor points out to which virtual team he belongs, and provides his authentication credentials. The data of said profiles are dynamically updated to take into account, for example, new macro-skills or changes in degree; the model of the profiles is stored in the data base ODB. The dynamic update of the macro-skills is carried out in a timely way, to enable all platform services (for example, that one of interaction among operators) to use up-to-date data. As regards loading of the data of the operator profiles, each Personal Proxy PP maintains only the profile of the operator to whom it is associated (each Personal Proxy PP is associated to a specific operator): the data of said profile are acquired by the OM interacting with appropriate external systems (WFM systems); the platform then envisages a centralized inventory (Expertise Inventory EI), in which the data of the profiles of all the operators (downloaded from the WFM) are stored. Upon start-up of each Personal Proxy PP, the operator-profile data associated to said Personal Proxy PP are automatically downloaded from the Expertise Inventory EI, via the Operational Manager OM, onto the Personal Proxy PP itself. The inventory EI is periodically updated and, at each update of the data on the inventory itself, data are sent to the corresponding Personal Proxy PP.

The customer profiles are defined on the basis of a small number of standard basic profiles; said profiles specifies the service/services, for which the customer can carry out self-repair activities (for example ADSL service, ISDN service, etc.), and the customer's authentication credentials. The data of the profiles are dynamically updated in order to take into account, for example, new services that have been undersigned; the model of the profiles is stored in the data base ODB. The dynamic update of the data of the customer profiles is made in a timely way in order to enable all platform services to use up to date data. As regards loading of the data of the customer profiles, each Personal Proxy PP maintains just the profile of the customer to which it is associated (each Personal Proxy PP is associated to a specific customer): the data of said profile are acquired by the Operational Manager OM by interacting with appropriate external systems (Business Support Systems); the platform then envisages a centralized inventory (Expertise Inventory EI) in which the data of the profiles of all the customers (downloaded from the Business Support Systems) are stored. Upon start-up of each Personal Proxy PP, the data of the customer profile associated to said Personal Proxy PP are automatically downloaded from the inventory EI, via the Operational Manager OM, onto the Personal Proxy PP itself. The inventory EI is periodically updated, and at each update of the data on the inventory itself data are sent to the corresponding Personal Proxy PP.

As regards workflows in support of operation of the field engineers, the data base ODB maintains, for each workflow, a set of features such as the workflow identifier (this may be a progressive numeric identifier automatically generated by the platform), the version of the workflow, the score of the workflow, the type of intervention to which the workflow applies (for example, failure, activities of Provisioning, operation activities, etc.), the identifier of the specific intervention to be performed (for example, in case of failure, it is possible to indicate link failure, user-card failure, etc.), the degree of macro-skills required in order to carry out the intervention, if applicable (e.g. expert field engineer and novel field engineer), etc. Said features are provided when the workflow is created/modified; the score is dynamically updated, in accordance with what is mentioned below. The creation/modification of the workflows supporting operation, stored in the data base OBD, and of the corresponding co-operative workflows, stored in the data base MDB, is made via an appropriate graphical interface which enables parallel editing of the two correlated workflows in order to facilitate congruency checks on what has been processed.

Similar considerations apply as regards the workflows supporting customer operation: the data base ODB maintains, for each workflow in support of the customer, a set of features similar to the ones of the workflows for the field engineer and also applicable to the customer case.

For the workflows in support of the field engineers two management functions are envisaged.

As regards loading of workflows, downloading of the workflow on the Personal Proxy PP will be carried out by the Control Agent CA associated thereto. Upon start-up of the Personal Proxy PP, no workflow is downloaded; the workflows are downloaded onto the Personal Proxy PP only upon explicit request by the Personal Proxy PP itself: downstream of the assumption of a given activity by a field engineer and of the selection by him of a workflow to be carried out or to be displayed on his device, the Personal Proxy PP checks whether said workflow is directly accessible in so far as it is already present in the local-memory area and whether it is updated (via the version indicator associated to the workflows). If the workflow is not present or not updated, via the Control Agent CA, it is downloaded from the data base ODB; the workflow will remain stored in the Personal Proxy PP for any possible future use.

In a similar way, upon start-up of the Resource Proxy RP no workflow is downloaded; the workflows are downloaded onto the Resource Proxy RP only upon explicit request by the Resource Proxy RP itself: at the moment in which the Resource Proxy RP receives from the Personal Proxy PP the request for activating a given workflow in support of operation, the Personal Proxy PP checks whether this is directly accessible in so far as it is already present in the local-memory area and whether it is updated (via the version indicator associated to the workflows). If the workflow is not present or is not updated, the Resource Proxy RP downloads it from the data base MDB; the workflow will remain stored in the Resource Proxy RP for possible future uses.

A procedure to dynamically manage the "score" of the workflows is then envisaged. The score of the workflow is based on both the time/cost data (linked to the activities performed by the field engineer and to the cost of materials used for performing these activities) and the preferences of the field engineer for a given workflow. In order to acquire these data, at each execution of a workflow a set of parameters, linked to said execution, is gathered (the collection of the workflow parameters is performed by the Personal Proxies PPs) and updated. Examples of such parameters are total time of execution of the workflow on the Personal Proxy PP, CPU usage, number of operators that have chosen the workflow, etc. The data gathered/updated are stored in the Performance Data Base PDB. Periodically (for example, at fixed time intervals), it is necessary to analyse and process said parameters to obtain a new value of the score for each workflow. The new score of the workflows is then communicated to the various Personal Proxies PPs.

Similar management functions are provided for workflows supporting the customers: the workflows are downloaded onto the Personal Proxy PP upon request by the Personal Proxy PP itself, downstream of the identification of the failure/problem to be handled with said workflows or upon receipt of the request to activate a specific workflow coming from the Personal Proxy PP of a Call Centre advisor. In particular, in case of a number of workflows that can be used to guide the customer, only the workflow that at that moment has the highest score is downloaded on the Personal Proxy PP. Also for workflows for the customer, a mechanism of dynamic management of the score is provided, appropriately calibrated on the parameters that can be identified at the customer end.

As has been seen, the interaction between the Personal Proxy PP and the operator or customer is realized by using an appropriate Personal Interface PI. The interface PI is created using technologies that depend upon the type and computational power of the device used by the operator/customer (PC, mobile phone, palmtop, etc.), such as for example web-based client-server technologies (HTML pages, Java Applet, stand-alone Java applications) or autonomic-agent technologies. The interface PI is designed consistently with the principles of usability in order to enable the operator/customer to achieve the target set with the best effectiveness, efficiency and satisfaction in all specific contexts of use. In the development of the interface PI, a great deal of attention has been paid both to code optimization, in order to render the interactions and activities, that the Personal Proxies PPs have to perform in cooperation with the Resource Proxies RPs, more effective, and to the aspects of usability and of user-friendliness of the GUI in order to highly improve the capability of the operator/customer to carry through the task assigned to him.

In case of an operator, upon an activity request (in-field intervention or Trouble Report/Customer Order) the WFM sends to the Operational Manager OM the name of the operator chosen and the details of the activity to be performed. The Operational Manager OM forwards said data to the Personal Proxy PP associated to the chosen operator, via the Operational Agent OA that co-ordinates said Personal Proxy PP; the Personal Proxy PP, in turn, notifies on the corresponding interface PI that there is an activity to be carried out.

Once the operator has received on his interface PI the information that there is an activity to be carried out, he proceeds as follows:

he starts, from the Home Page of the interface PI, the login and authentication procedure; based on the operator profile, sections dedicated to "privileged" functions may or may not be displayed; the authentication data are verified against the ones stored in the Expertise Inventory EI for the operator associated to said Personal Proxy PP;

he displays the data on the activity assigned to him and executes the procedure of assumption of said activity (e.g. in-field intervention or Trouble Report/Customer Order); at this point, the operator can gain access, through the interface PI, to graphical and navigation environments as aid to operation; the functions provided by these environments are in part available to and used by all types of operators (for example field engineers and Call Centre advisors) and in part specific for a certain type of operator.

These functions enable:

display of location of the equipment (for example within an exchange) on which to carry out the intervention (field engineers);

display of the interface of the equipment and graphical identification of the hardware component (rack, card, port, device, etc.) on which it is necessary to intervene (field engineers);

presentation of the workflow (with possible prior option of selection among different workflows) in an interactive mode, in order to guide, step by step, operation of the engineer (field engineers);

presentation of a sequence of questions in an interactive way in order to acquire, step by step, the information required to detail the request of a customer (Call Centre advisors);

suggestion of actions, which the customer should carry out in order to solve a Trouble Report presented by the customer himself (Call Centre advisors);

presentation of the hypotheses made on the cause of the Trouble Report of a customer (Call Centre advisors);

display of the setting-up of the connections between the Personal Proxy PP and Resource Proxy RP, and presentation of the "replies" from the Resource Proxy RP to the actions of configuration, setting, measurement, testing, etc. carried out by the RP either autonomously or upon request from the Personal Proxy PP (all operators);

remote access, via the RP, to a CLI (Command Line Interface) on the equipment on which the intervention is being carried out (field engineers);

display of the on-line documentation as possible support to the activity (all operators); and access to the "traditional" functions of communication with other operators (Virtual-Team operators, management staff, back office operators, Call Centre advisors): voice call, e-mailing, chatting, shared white board etc. (all operators).

In case of a customer, the customer himself, following upon start-up of his Personal Proxy PP, executes the login and authentication procedure and receives on his device all data (questions, guide workflows, etc.) required to solve a malfunction detected by him.

The functions offered enable:

presentation of the workflow in an interactive mode, in order to guide, step by step, operationality of the customer;

presentation of a sequence of questions in an interactive mode, in order to acquire, step by step, the information required to identify the cause of the malfunction detected by the customer;

presentation of the hypothesis on the root cause of a malfunction;

display of the setting-up of connections between the Personal Proxy PP and the Resource Proxy RP, and presentation of the "replies" from the Resource Proxy RP;

notification of the need to contact an operator to solve the malfunction;

access to the functions of communication with an operator.

The components supporting operation above described find application also in management contexts based on more traditional technological approaches (client-server paradigm).

If we examine for example, management solutions that adopt a hierarchical approach based on client-server technology (as, for instance, exemplified by US-A-2004/0196794), the functions to support operation (of operators and customers) previously described are still effective and can be offered by using a platform which, for the operational part, does not change with respect to what is presented in FIG. 2 herein, whilst, for the network and service management part, relies upon the architecture described in FIG. 2 of US-A-2004/0196794. In particular, in this case, if the aim is to adopt a conservative approach that does not envisage modification of the management component (Lower-layer network-management station) which directly manages the devices in the network, the Personal Proxy PP would interface directly with the corresponding Lower-layer network-management station to carry out all interactions from/to the network (which, in the embodiment above described, were performed through the Resource Proxy RP), using communication modalities similar to the ones adopted between Upper-layer and Lower-layer network-management stations. Alternatively, the Personal Proxy PP could interact with the Upper-layer network-management station, which owns the topological information on the Lower-layer network-management stations, thus avoiding having to handle said information directly. In either case, except for modifications to the management component, there would not be a co-operative workflow on the network-management station concerned: this, however, in no way jeopardizes the validity and effectiveness of the function to support operation, in so far as this represents only one possible alternative to the preferred embodiment of the present invention.

It will be appreciated that, whereas the procedure guiding the field engineers in carrying out a given intervention, as described in connection with FIG. 3, refers to the selection of the intervention to be carried out by a field engineer, the modalities with which said selection is made are various, and depend upon the operational paradigm adopted and upon the functions performed by the WFM system. In one embodiment of the present invention, the field engineer only takes charge of the intervention, which is presented to him by the Personal Proxy PP on his interface PI, and that was downloaded to the Personal Proxy PP itself via the WFM-OM chain.

In an alternative embodiment, the field engineer selects an activity from the ones to be carried out on an equipment in a given site; in this case, the only indication received by the field engineer, via the Personal Proxy PP that, in turn, received it from the WFM-OM chain, is the one related to the site to which he have to go (the WFM only manages the periodic rounds of the field engineers among the various sites, without indicating to them what they have to do).

The procedure previously described in connection with FIG. 3 indicates that appropriate workflows are proposed to the field engineer. This is done by interaction between the Personal Proxy PP and the Operational Manager OM. When an intervention is selected by a field engineer, the Personal Proxy PP asks the Operational Manager OM for the list of all workflows to support said intervention. The Operational Manager OM dynamically creates this list, based on workflow information available in the data base ODB, and sends it to the Personal Proxy PP, which presents it to the field engineer.

In a first possible embodiment of the present invention, given a specific intervention, all field engineers are then presented with the same workflows, irrespective of their particular skill degree.

In an alternative embodiment, given a specific intervention, the workflows presented to a field engineer depend upon his own skill degree. If the field engineer is an expert, he is presented with workflows of higher level; otherwise, the workflows proposed are more detailed or in any case allow to access documents and technical standards helpful for the field engineer. In the first case, the selection by the Operational Manager OM of the workflows to be put in the list is, therefore, made considering only the type of intervention to be carried out, whereas, in the second case, also the profile of the field engineer is taken into account and in particular his skill degree with reference to the skill required to carry out the intervention in question.

Again, in an alternative embodiment of the present invention, the activation of the workflow on the Personal Proxy PP does not involve activation of a co-operative workflow on the Resource Proxy RP: the workflow on the Personal Proxy PP only activates in an interactive way specific workflows on the Resource Proxy RP in order to gather some given data/measurements, to request execution of given activities on the equipment, or to make available a remote access to possible command line interfaces. The workflows execute what is requested and return the result to the personal proxy PP. In this case, the Resource Proxy RP does not know what the operator, guided by the Personal Proxy PP, is doing. This entails that, as last step, the workflow on the personal proxy PP should ask the Resource Proxy RP to check the outcome of the intervention carried out by the field engineer, before considering said intervention successfully carried out.

As has been seen, the procedure to support a Call Centre advisor allows to activate, whenever necessary, a workflow on the Personal Proxy PP of the customer. This requires the Personal Proxy PP to be active. Activation of the Personal Proxy PP can occur automatically, with a request for activation from the Personal Proxy PP of the operator or else in manual mode, with activation of the Personal Proxy PP by the customer. In this latter case, the Personal Proxy PP itself can already be on the customer device and must just be activated, or else the customer can download it from a purposely provided site. In an alternative embodiment, said procedure does not envisage activation of a workflow on the Personal Proxy PP of the customer: the Call Centre advisor only interacts with the customer by means of a question-answer paradigm, at the most asking him to carry out some particular actions.

Also the procedure to support the customer envisages an alternative embodiment in which, once the Personal Proxy PP has detected the need to contact a Call Centre advisor to solve the malfunction reported by the customer, instead of suggesting to the customer to contact the Call Centre, directly activates a session with the Personal Proxy PP of a Call Centre advisor.

As regards the co-operation among operators, it may again be noted what is described in the sequel. The procedure described with reference to FIG. 7 envisages preparing an orderly list of names of operators to be contacted, used by the PP to open a session among operators or else presented to the operator: said list is created in a dynamic way. At the moment in which the Personal Proxy PP should open a co-operative session, it asks the Operational Manager OM to create the list of the operators to be contacted, providing him with the required indications (for example, indication of the activity performed by the operator and of the skill required for said activity); the Operational Manager OM queries the Expertise Inventory EI and, based on the obtained information, draws up the required list (entering operators of the same Virtual Team or even of other Teams). The list is ordered according to the skills of the operators and, in case of different Teams, according to the Teams (first the operators of the same Virtual Team are entered, according the decreasing degree of skill, then operators of other Teams, once again in decreasing degree of skill). Finally, the Operational Manager OM sends the list created to the Personal Proxy PP.

In an embodiment alternative to the one previously presented the Personal Proxy PP can open sessions between an operator and two or more other operators, which can interact with one another via various tools, including tools to support co-operative work.

Also in case of co-operation between customer and operator the same modalities are applied of dynamic creation, by the Operational Manager OM, of the list of operators to be contacted, used by the Personal Proxy PP to open a session between customer and operator, or else presented to the customer.

Now taking into account the management of the operator profiles on the Personal Proxy PP in an embodiment alternative to the one above presented, each PP maintains, in addition to the profile of the operator to which it is associated, also the data of other operator profiles (this is done for performance reason: in this way, time to access data of other operators to be contacted comes down). In particular, a first alternative envisages that said data should refer to all operators in the same Virtual Team as that of the operator to which the Personal Proxy PP is associated. A second alternative is possible also, according to which the data on the operator profiles stored in the Personal Proxy PP refer to a subset of the operators in the Virtual Team of interest and in particular regard the operators equipped, to a high degree, with the macro-skills required to the Team: for each macro-skill one or more profiles are selected; these profile are the profiles of operators who are experts as regards a specific macro-skill (i.e., whose skill is the highest amongst the ones of a given Virtual Team). The ways said data are downloaded for the first time and are subsequently updated do not change with respect to what has been described for the profile of the operator associated to the Personal Proxy PP; in this case, however, in the data forwarded to the Personal Proxy PP there is also the indication of which ones refer to the profile of the operator associated to the Personal Proxy PP itself.

Management of the operator profiles in a further embodiment is completely dynamic, in the sense that the Personal Proxy PP is not associated a priori to any specific operator: the association with a given operator is done when the operator authenticates. In this case, following upon authentication by the operator, the Proxy PP forwards to the Operational Manager OM the authentication data supplied by the operator and asks him to download the profile data regarding said operator. The Operational Manager OM, after prior check of the correctness of the supplied credentials, downloads onto the PP the data of the profile in question. Also in this case, it is possible to envisage an alternative embodiments in which the Operational Manager OM sends to the Personal Proxy PP not only the data of the profile of the operator to which it is associated, but also the data of other operator profiles, with the same options seen above (data referring to all operators of the Virtual Team of the operator, or to a subset of the operators of the Virtual Team).

As regards the procedure of management of the workflows to support operators, with respect to what was previously mentioned it is possible to envisage alternative embodiments of the modalities to be adopted for downloading the workflows.

A first embodiment envisages that at start-up of the Personal Proxy PP all workflows for guiding the operator are downloaded thereon.

According to a second embodiment, instead, at start-up of the Personal Proxy PP or after authentication of the operator (according to whether the Personal Proxy PP is associated to an operator in a static or dynamic way) all workflows for guiding the operator are downloaded thereon with the exclusion of possible workflows applicable only to specific Virtual Teams. It is possible to define workflows that apply only to specific Virtual Teams, based on the characteristics of the equipments managed by these teams and/or based on the particular skills of the members of the team.

Finally, according to a third embodiment, at start-up of the Personal Proxy PP or downstream of the operator authentication, only the workflows that are consistent with the skills of the operator to which the PP is associated are downloaded thereon.

On the basis of possible alternative embodiments adopted, also the functions of the interface PI can change: in particular, if the only indication received by the field engineer on the interface PI is the one regarding the site to which he must go, the interface PI will present to the field engineer the set of the interventions to be made in a given site (consistently with the profile of the field engineer), and it will be the field engineer himself who will select the intervention to be carried out and take charge of it.

Consequently, without prejudice to the principles underlying the invention, the details and the embodiments may vary, even appreciably, with respect to what has been described herein purely by way of example, without departing from the scope of the invention as defined by the annexed claims.

The invention claimed is:

1. A method of generating instruction signals arranged in workflows within a network management platform for performing interventions on separate network equipment included in a communication network, wherein said network equipment has associated therewith resource proxy agents within the network management platform, the method comprising:
   providing a distributed architecture of intervention management proxy agents within the network management platform, wherein:
      the intervention management proxy agents manage interventions on the network equipment, and
      the intervention management proxy agents are associated with terminal devices;
   generating instruction signals within the network management platform for performing an intervention on at least the network equipment of said communication network via one of said intervention management proxy agents in an interactive mode with at least one of said resource proxy agents associated with said network equipment, wherein said instruction signals are a function of the status of said network equipment, and wherein the interactive mode specifies which steps an operator should take and provides feedback as each step is completed; and
   coupling with said intervention management proxy agents personal interfaces comprising said instruction signals arranged in at least one workflow, wherein the at least one workflow is configured to assist the operator in performing the intervention.

2. The method of claim 1, wherein each of said resource proxy agents is responsible for managing a single network equipment.

3. The method of claim 1, further comprising arranging said distributed architecture in hierarchical layers comprising:
   a layer of operational agents coordinating operation of said intervention management proxy agents; and
   a layer comprising an operational manager having management and control functions and supervising operation of said operational agents.

4. The method of claim 3, further comprising allotting to said operational agents, the distributed execution of interventions over a plurality of said intervention management proxy agents.

5. The method of claim 1, further comprising arranging said distributed architecture in hierarchical layers, wherein one layer comprises an operational manager having management and control functions and directly coordinating operation of said intervention management proxy agents.

6. The method of claim 3, further comprising allotting, to each of said intervention management proxy agents, the task of supporting a single operator or customer, wherein execution of said interventions is de-coupled with respect to said management and control functions.

7. The method of claim 1, further comprising providing process engines to said intervention management proxy agents.

8. The method of claim 3, further comprising providing process engines to all said layers in said distributed architecture.

9. The method of claim 7, wherein providing process engines comprises providing at least one of a workflow, a rule engine and combination thereof.

10. The method of claim 3, further comprising including in said layers, components adapted to perform respective functions based on respective instruction information provided to them.

11. The method of claim 10, further comprising providing in said instruction information at least one of:
   a process definition, which comprises at least one of a workflow and a rule, and
   a data models definition.

12. The method of claim 1, further comprising configuring said intervention management proxy agents for interacting directly with one another in an interworking relationship, wherein at least one of said instruction signals is produced by interaction between intervention management proxy agents.

13. The method of claim 1, further comprising configuring said intervention management proxy agents for peer-to-peer interaction with said resource proxy agents.

14. The method of claim 1, further comprising organizing an operational data base as a repository of process definitions and data model definitions of said interventions.

15. The method of claim 1, further comprising organizing a model data base as a repository of process definitions and data model definitions for managing said network equipment.

16. The method of claim 3, further comprising organizing a single performance data base storing performance data related to said layers of said distributed architecture.

17. The method of claim 1, further comprising organizing an operational log storing all activities performed by users of said intervention management proxy agents.

18. The method of claim 1, further comprising organizing an expertise inventory storing profiles of operators or customers managed by said intervention management proxy agents.

19. The method of claim 3, further comprising providing control agents associated with at least one layer of said distributed architecture for performing at least one step selected from the group of:
   distributing process definitions to said layers of said distributed architecture;
   distributing data model definitions to said layers of said distributed architecture; and
   monitoring the state of said layers of said distributed architecture.

20. The method of claim 19, further comprising providing a manager module for performing at least one step selected from the group of:
   managing the distribution of process definitions to said layers of said distributed architecture via said control agents;

managing the distribution of data model definitions to said layers of said distributed architecture via said control agents; and monitoring the state of said layers of said distributed architecture via said control agents.

21. A system for generating instruction signals arranged in workflows configured to assist an operator in performing interventions on separate network equipment in a communication network, wherein said network equipment has associated therewith resource proxy agents within the system, comprising a distributed architecture of intervention management proxy agents for generating said instruction signals, said intervention management proxy agents being associated with terminal devices and managing interventions on the network equipment, the system further comprising personal interfaces coupled with said intervention management proxy agents to present to the operator said instruction signals arranged in workflows, wherein said interventions are performed via at least one of said intervention management proxy agents in an interactive mode with at least one of said resource proxy agents associated with said network equipment, wherein said resource proxy agents manage said network equipment during said interventions, wherein the interactive mode specifies which steps the operator should take and provides feedback as each step is completed, and wherein said instruction signals are a function of the status of the network equipment on which said interventions are performed.

22. The system of claim 21, wherein each of said resource proxy agents is responsible for managing a single network equipment.

23. The system of claim 21, wherein said distributed architecture comprises hierarchical layers comprising:
a layer of operational agents coordinating operation of said intervention management proxy agents; and
a layer comprising an operational manager having management and control functions and supervising operation of said operational agents.

24. The system of claim 23, wherein said operational agents are allotted the distributed execution of interventions over a plurality of said intervention management proxy agents.

25. The system of claim 21, wherein said distributed architecture comprises hierarchical layers, wherein one layer comprises an operational manager having management and control functions and directly supervising operation of said intervention management proxy agents.

26. The system of claim 23, wherein each of said intervention management proxy agents is allotted the task of supporting a single operator or customer, wherein execution of said interventions is de-coupled with respect to said management and control functions.

27. The system of claim 21, wherein said intervention management proxy agents are configured for interacting directly with one another in an interworking relationship, wherein said instruction signals comprise instruction signals produced by interaction among intervention management proxy agents.

28. The system of claim 21, wherein said intervention management proxy agents comprise respective process engines.

29. The system of claim 23, wherein said layers comprise process engines.

30. The system of claim 28, wherein said process engines comprise at least one of a workflow, a rule engine and a combination thereof.

31. The system of claim 23, wherein said layers in said architecture comprise components adapted to perform respective functions based on respective instruction information provided to them.

32. The system of claim 31, wherein said instruction information comprises at least one of:
a process definition, which comprises at least one of a workflow and a rule, and
a data models definition.

33. The system of claim 21, wherein said intervention management proxy agents are configured for peer-to-peer interaction with said resource proxy agents.

34. The system of claim 21, comprising an operational data base as a repository of process definitions and data model definitions of said interventions.

35. The system of claim 21, comprising a model data base as a repository of process definitions and data model definitions for managing said network equipment.

36. The system of claim 23, comprising a single performance data base storing performance data related to said layers of said distributed architecture.

37. The system of claim 21, comprising an operational log storing all activities performed by users of said intervention management proxy agents.

38. The system of claim 21, comprising an expertise inventory storing profiles of operators or customers managed by said intervention management proxy agents.

39. The system of claim 23, wherein at least one layer of said distributed architecture comprises control agents for performing at least one step selected from the group of:
distributing process definitions to said layers of said distributed architecture;
distributing data model definitions to said layers of said distributed architecture; and
monitoring the state of said layers of said distributed architecture.

40. The system of claim 39, comprising a manager module for performing steps selected from the group of:
managing distribution of process definitions among said layers of said distributed architecture via said control agents;
managing distribution of data models among said layers of said distributed architecture via said control agents; and
monitoring the state of said layers of said distributed architecture via said control agents.

41. A non-transitory computer-readable medium containing instructions that, when executed by a computer, perform a method of generating instruction signals arranged in workflows within a network management platform for performing interventions on separate network equipment included in a communication network, wherein said network equipment has associated therewith resource proxy agents within the network management platform, the method comprising:
providing a distributed architecture of intervention management proxy agents within the network management platform, wherein:
the intervention management proxy agents manage interventions on the network equipment, and
the intervention management proxy agents are associated with terminal devices;
generating instruction signals within the network management platform for performing an intervention on at least the network equipment of said communication network via one of said intervention management proxy agents in an interactive mode with at least one of said resource proxy agents associated with said network equipment, wherein said instruction signals are a function of the status of said network equipment, and wherein the interactive mode specifies which steps an operator should take and provides feedback as each step is completed; and coupling with said intervention management proxy agents personal interfaces comprising said instruction signals arranged in at least one workflow, wherein the at least one workflow is configured to assist the operator in performing the intervention.

42. A method of generating instruction signals arranged in workflows within a network management platform for performing interventions on separate network equipment included in a communication network, wherein said network equipment has associated Resource Proxy agents within the network management platform, the method comprising:

providing a distributed architecture of intervention management proxy agents within the network management platform, wherein:
the intervention management proxy agents manage interventions on the network equipment, and
the intervention management proxy agents are associated with terminal devices;
generating instruction signals within the network management platform for performing an intervention on at least the network equipment of said communication network in an interactive mode by an operator via one of said intervention management proxy agents and by at least one of said Resource Proxy agents managing said network equipment, wherein said instruction signals are a function of the status of said network equipment and are arranged in at least one workflow, the at least one workflow configured to assist an operator in performing the intervention, wherein the interactive mode specifies which steps the operator should take and provides feedback as each step is completed, and
configuring said intervention management proxy agents for interacting directly with one another in an interworking relationship, wherein at least one of said instruction signals is produced by interaction between intervention management proxy agents in an interactive manner with at least one of said resource proxy agents associated with said network equipment.

43. A method of generating instruction signals arranged in workflows within a network management platform for performing interventions on separate network equipment included in a communication network, wherein said network equipment has associated Resource Proxy agents within the network management platform, the method comprising:

providing a distributed architecture of intervention management proxy agents within the network management platform, wherein:
the intervention management proxy agents manage interventions on the network equipment, and
the intervention management proxy agents are associated with terminal devices;
generating instruction signals within the network management platform for performing an intervention on at least the network equipment of said communication network in an interactive manner by an operator via one of said intervention management proxy agents and by at least one of said Resource Proxy agents managing said network equipment and are arranged in at least one workflow, the at least one workflow configured to assist the operator in performing the intervention, wherein said instruction signals are a function of the status of said network equipment;

configuring said intervention management proxy agents for interacting directly with one another in an interworking relationship, wherein at least one of said instruction signals is produced by interaction between intervention management proxy agents in an interactive mode with at least one of said resource proxy agents associated with said network equipment, and wherein the interactive mode specifies which steps the operator should take and provides feedback as each step is completed; and organizing an Expertise Inventory storing profiles of operators or customers managed by said intervention management proxy agents.

44. A system for generating instruction signals arranged in workflows within a network management platform for performing interventions on separate network equipment included in a communication network, wherein at least a portion of the workflows are configured to assist an operator in performing the intervention and wherein said network equipment has associated Resource Proxy agents within the system, the system comprising a distributed architecture of intervention management proxy agents for generating said instruction signals, said intervention management proxy agents being associated with terminal devices, wherein said intervention management proxy agents are interactively coupled with said Resource Proxy agents, wherein said Resource Proxy agents manage said network equipment during said interventions, and wherein said instruction signals are a function of the status of the network equipment on which said interventions are performed, wherein said intervention management proxy agents are configured for interacting directly with one another in an interworking relationship, wherein said instruction signals comprise instruction signals produced by interaction among intervention management proxy agents in an interactive mode with at least one of said resource proxy agents associated with said network equipment, wherein the interactive mode specifies which steps the operator should take and provides feedback as each step is completed.

45. A system for generating instruction signals arranged in workflows within a network management platform for performing interventions on separate network equipment included in a communication network, wherein at least a portion of the workflows are configured to assist an operator in performing the intervention and wherein said network equipment has associated Resource Proxy agents within the system, the system comprising a distributed architecture of intervention management proxy agents for generating said instruction signals, said intervention management proxy agents being associated with terminal devices, wherein said intervention management proxy agents are interactively coupled with said Resource Proxy agents, wherein said Resource Proxy agents manage said network equipment during said interventions, and wherein said instruction signals are a function of the status of the network equipment on which said interventions are performed, wherein said intervention management proxy agents are configured to interact directly with one another in an interworking relationship, and wherein at least one of said instruction signals is produced by interaction between intervention management proxy agents, and wherein an interactive mode specifies which steps the operator should take and provides feedback as each step is completed, the system further including an Expertise Inventory storing profiles of operators or customers managed by said intervention management proxy agents.

46. A method of generating instruction signals arranged in workflows within a network management platform for performing interventions on separate network equipment included in a communication network, wherein said network equipment has associated therewith resource proxy agents within the network management platform, the method comprising:
- providing a distributed architecture of intervention management proxy agents within the network management platform, wherein:
  - the intervention management proxy agents manage interventions on the network equipment, and
  - the intervention management proxy agents are associated with terminal devices;
- configuring said intervention management proxy agents for interacting directly with one another in an interworking relationship;
- generating instruction signals within the network management platform for assisting an operator in performing an intervention on at least the network equipment of said communication network wherein said instruction signals are a function of the status of said network equipment and wherein at least one of said instruction signals is produced by interaction between intervention management proxy agents; and
- coupling with said intervention management proxy agents personal interfaces comprising said instruction signals arranged in at least one workflow, wherein the at least one workflow is configured to assist the operator in performing the intervention by providing the operator with interactive instructions that specify which steps the operator should take and provide feedback as those steps are completed.

47. A system for generating instruction signals arranged in workflows configured to assist an operator in performing interventions on separate network equipment in a communication network, wherein said network equipment has associated therewith resource proxy agents within the system, comprising a distributed architecture of intervention management proxy agents for generating said instruction signals, said intervention management proxy agents being associated with terminal devices and managing interventions on the network equipment, said intervention management proxy agents being configured to interact directly with one another in an interworking relationship, the system further comprising personal interfaces coupled with said intervention management proxy agents to present to the operator said instruction signals arranged in workflows, wherein the workflows are configured to assist the operator in performing the intervention by providing the operator with interactive instructions that specify which steps the operator should take and provide feedback as those steps are completed, wherein said intervention management proxy agents are interactively coupled with said resource proxy agents, wherein said resource proxy agents manage said network equipment during said interventions, wherein said instruction signals are a function of the status of the network equipment on which said interventions are performed, and wherein at least one of said instruction signals is produced by interaction between intervention management proxy agents.

* * * * *